United States Patent
Howes

(10) Patent No.: US 8,061,941 B2
(45) Date of Patent: Nov. 22, 2011

(54) METHOD FOR RETROFITTING A CHAIN TIE DOWN SYSTEM TO PARALLEL SHAFT STRAP TIE DOWN SYSTEM

(75) Inventor: Philip Bryan Howes, Braselton, GA (US)

(73) Assignee: Cottrell, Inc., Gainesville, GA (US)

( * ) Notice: Subject to any disclaimer, the term of this patent is extended or adjusted under 35 U.S.C. 154(b) by 186 days.

(21) Appl. No.: 12/567,822

(22) Filed: Sep. 28, 2009

(65) Prior Publication Data

US 2010/0014934 A1    Jan. 21, 2010

Related U.S. Application Data

(63) Continuation-in-part of application No. 12/025,417, filed on Feb. 4, 2008.

(60) Provisional application No. 61/151,954, filed on Feb. 12, 2009.

(51) Int. Cl.
*B60P 7/08*    (2006.01)

(52) U.S. Cl. .................. 410/20; 410/7; 410/12; 410/19; 410/23; 410/100; 410/103

(58) Field of Classification Search ................ 410/7–12, 410/19, 20, 22, 23, 100, 103; 24/265 CD; 254/217, 223, 369; 248/499
See application file for complete search history.

(56) References Cited

U.S. PATENT DOCUMENTS

| | | |
|---|---|---|
| 4,045,002 A | 8/1977 | Miller |
| 4,960,353 A | 10/1990 | Thorndyke |
| 5,800,105 A | 9/1998 | Stump |
| 6,848,871 B1 | 2/2005 | Cottrell |
| 7,114,897 B1 | 10/2006 | Boydstun, IV et al. |
| 7,360,978 B2 | 4/2008 | Howes |
| 7,682,114 B2 * | 3/2010 | Howes et al. .................. 410/20 |
| 2006/0263160 A1 | 11/2006 | Howes |
| 2006/0263161 A1 | 11/2006 | Howes |

* cited by examiner

*Primary Examiner* — Stephen Gordon
(74) *Attorney, Agent, or Firm* — Cantor Colburn LLP

(57) ABSTRACT

A method for retrofitting chain tie down systems to strap tie down systems. Exemplary embodiments include a method for retrofitting a chain tie down apparatus to a strap tie down apparatus, the chain tie down apparatus having a central shaft, the method including affixing a first parallel shaft adjacent the central shaft and affixing shaft plates to the central shaft, wherein the first parallel shaft is radially moveable with respect to the central shaft.

8 Claims, 24 Drawing Sheets

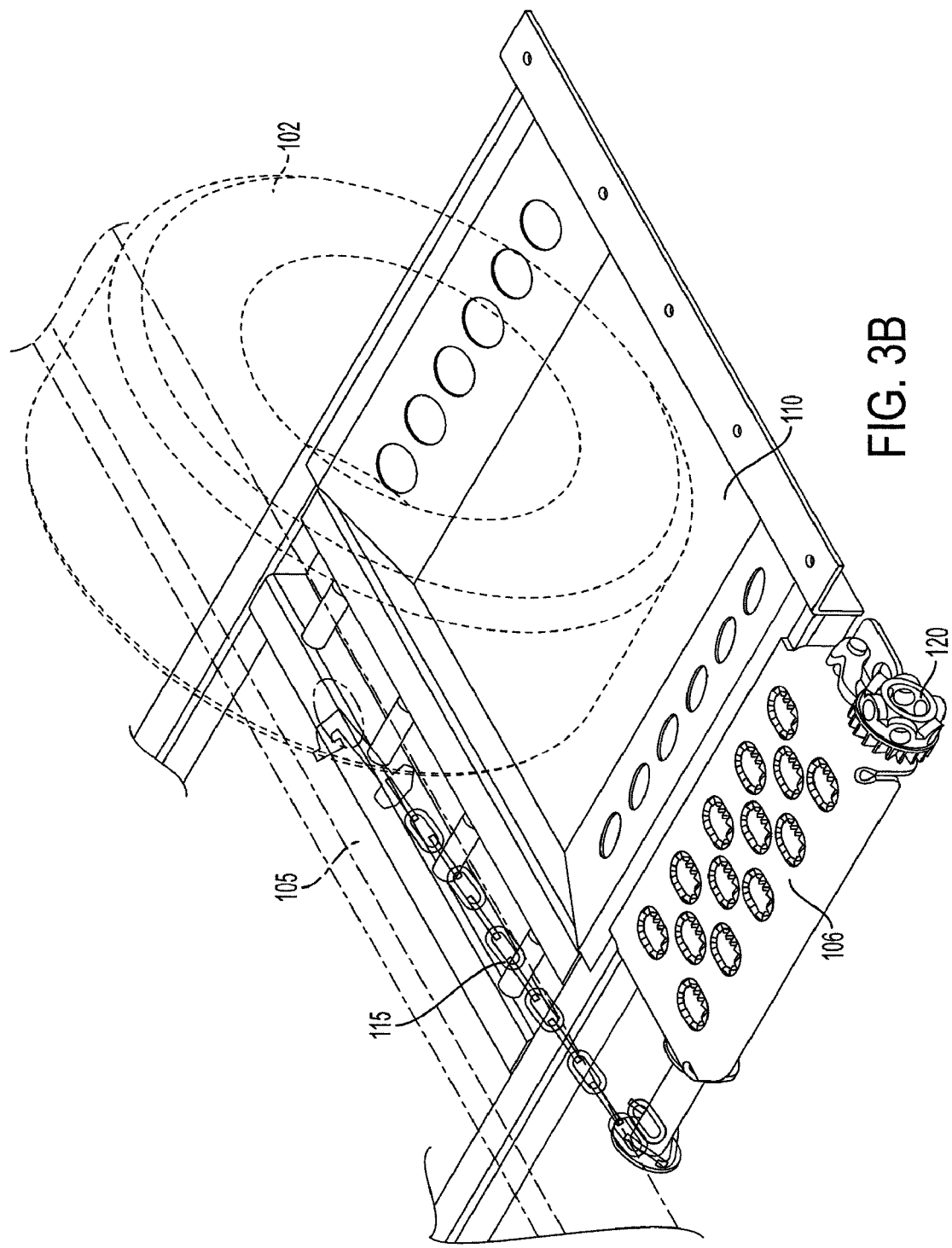

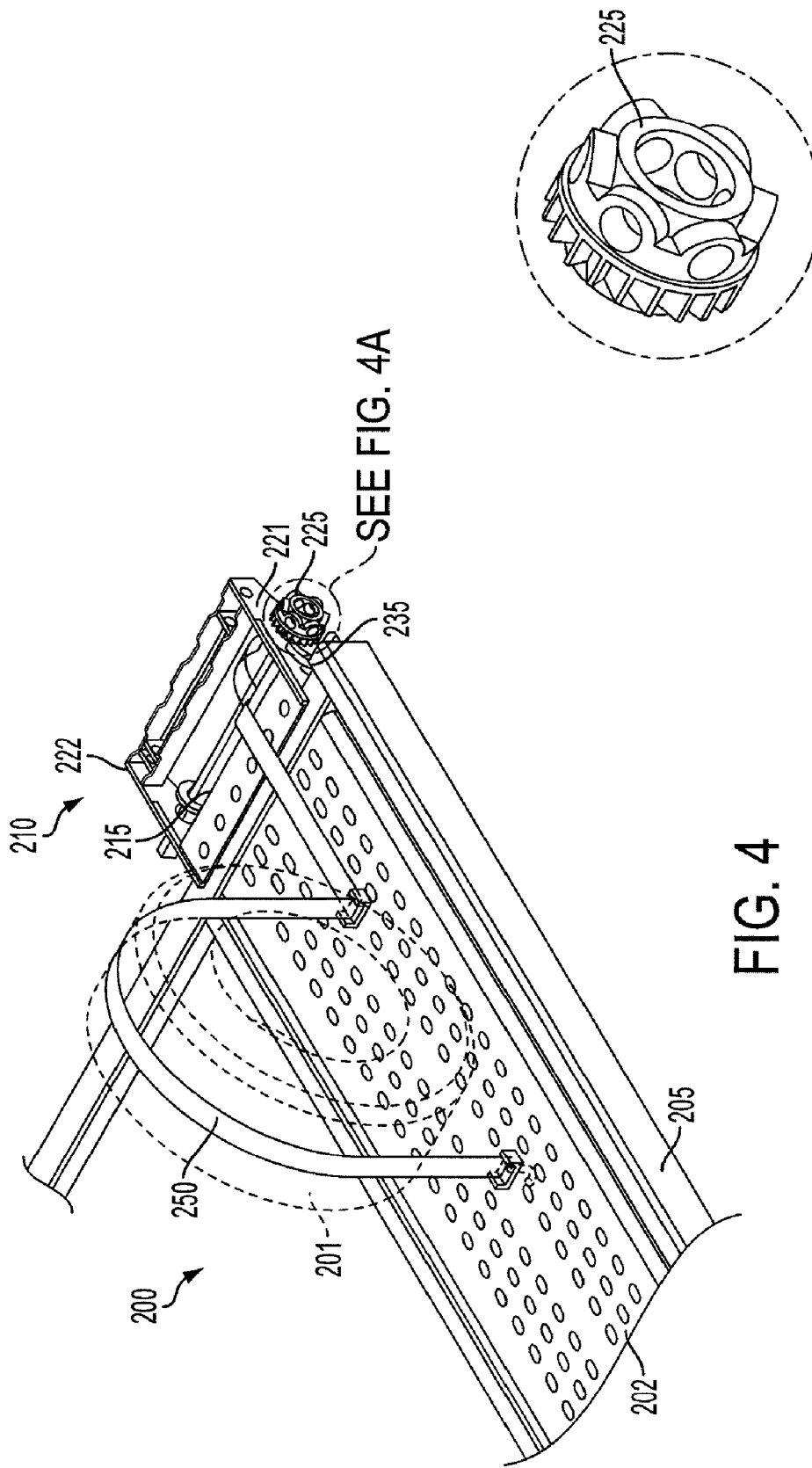

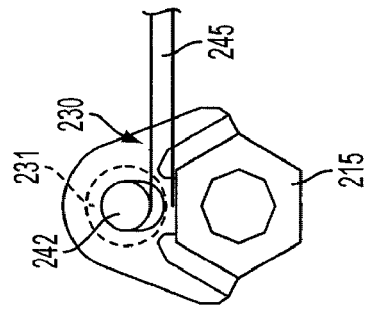
FIG. 6
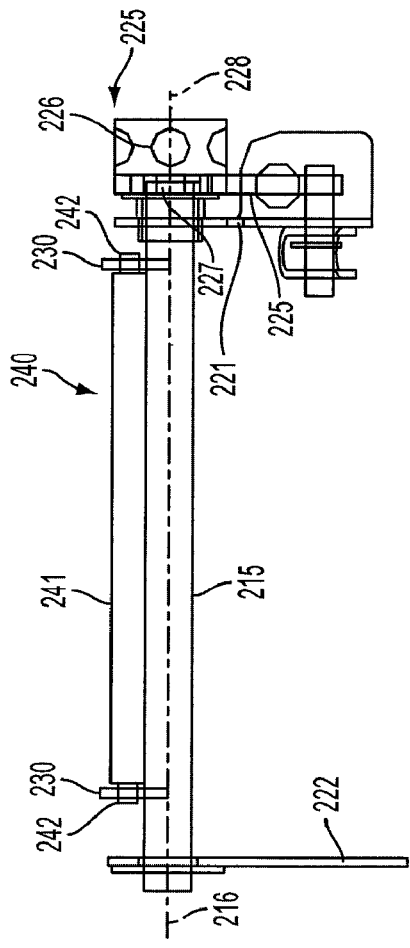
FIG. 5
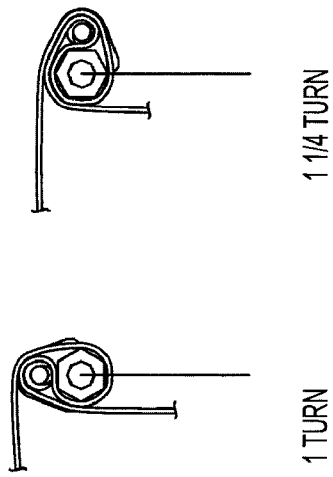
START    FIG. 7A
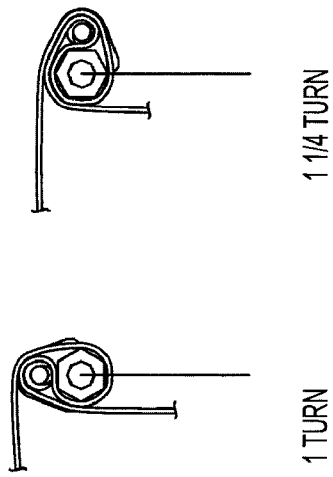
1/4 TURN    FIG. 7B
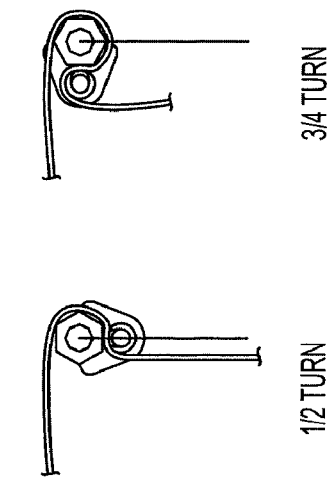
1/2 TURN    FIG. 7C
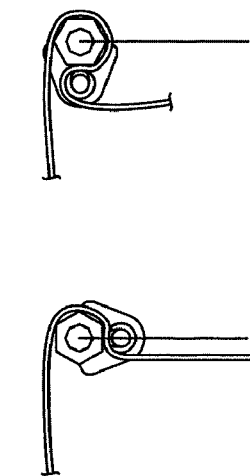
3/4 TURN    FIG. 7D
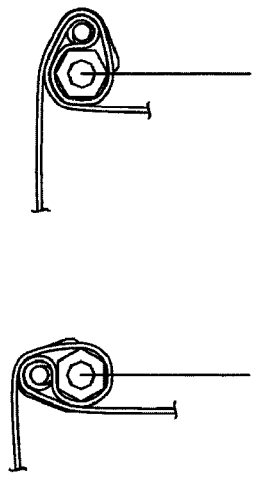
1 TURN    FIG. 7E
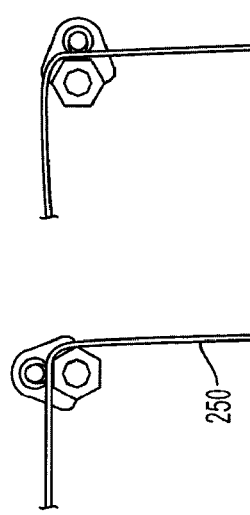
1 1/4 TURN    FIG. 7F

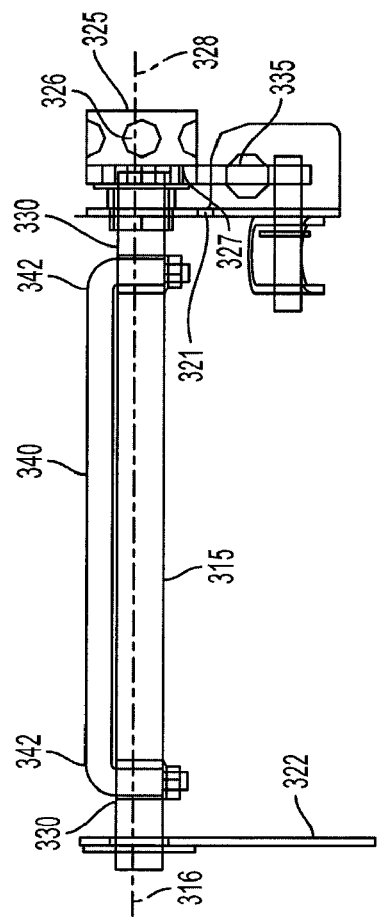
FIG. 9
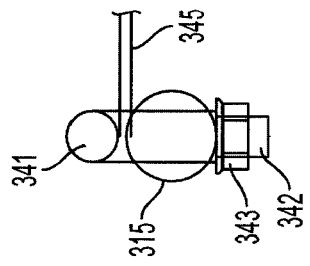
FIG. 10
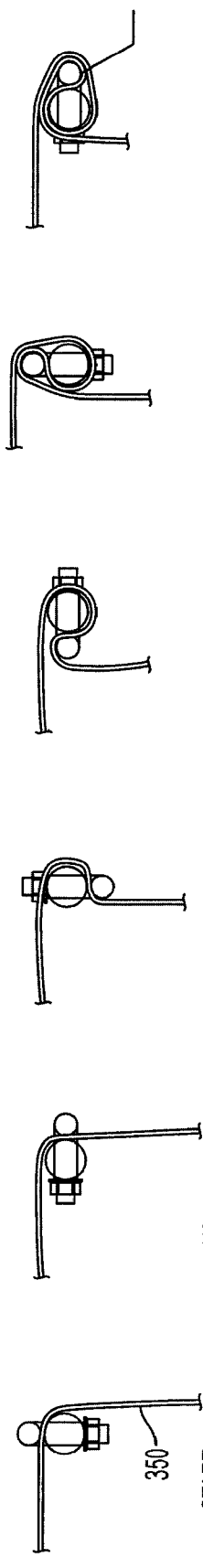
FIG. 11A START
1/4 TURN FIG. 11B
1/2 TURN FIG. 11C
3/4 TURN FIG. 11D
1 TURN FIG. 11E
1 1/4 TURN FIG. 11F

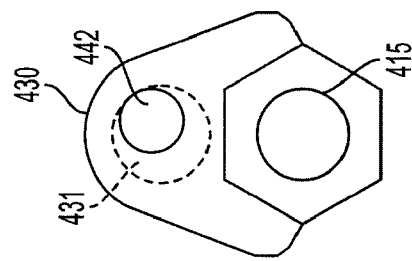
FIG. 14A  FIG. 14B  FIG. 14C
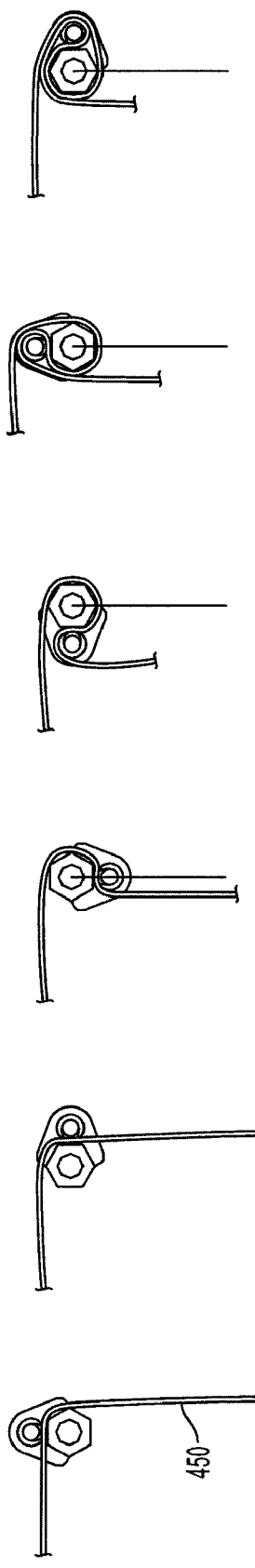
FIG. 15A START
FIG. 15B 1/4 TURN
FIG. 15C 1/2 TURN
FIG. 15D 3/4 TURN
FIG. 15E 1 TURN
FIG. 15F 1 1/4 TURN

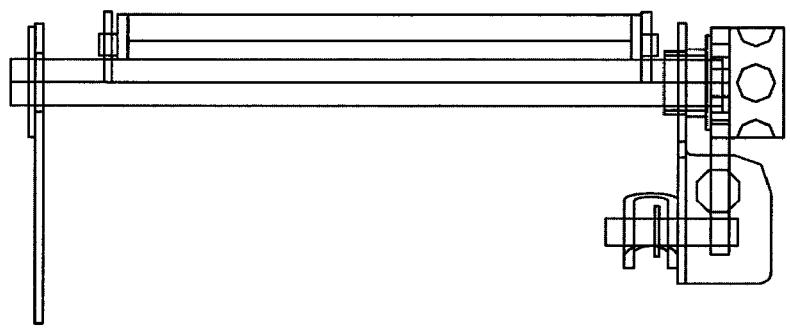
FIG. 17A
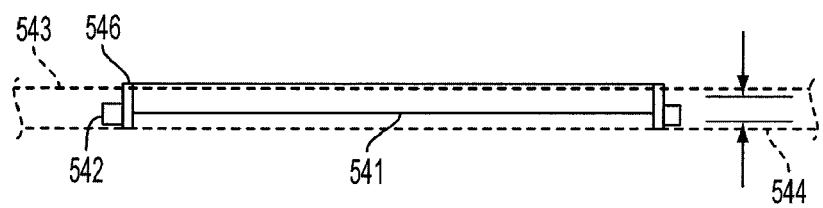
FIG. 17B
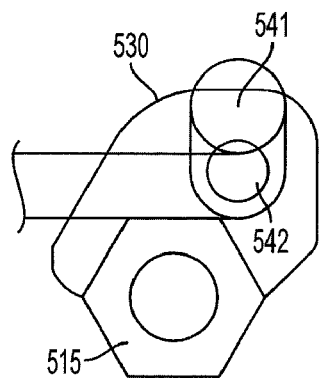   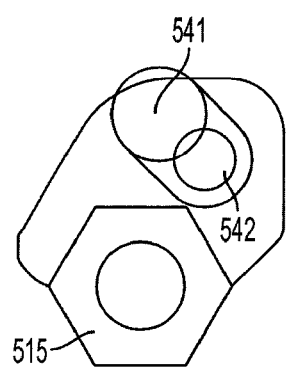   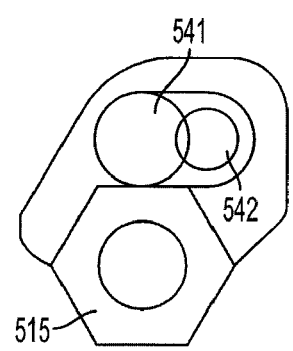
FIG. 18A          FIG. 18B          FIG. 18C

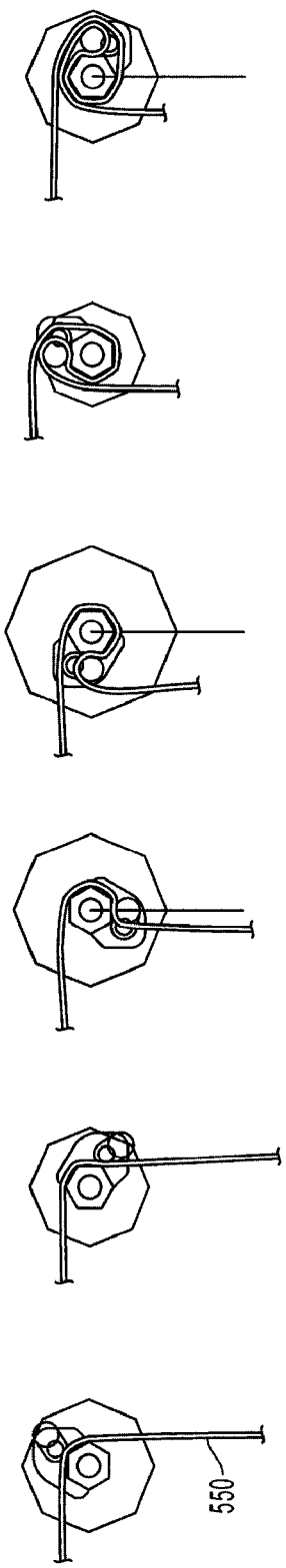
FIG. 19A START
FIG. 19B 1/4 TURN
FIG. 19C 1/2 TURN
FIG. 19D 3/4 TURN
FIG. 19E 1 TURN
FIG. 19F 1 1/4 TURN
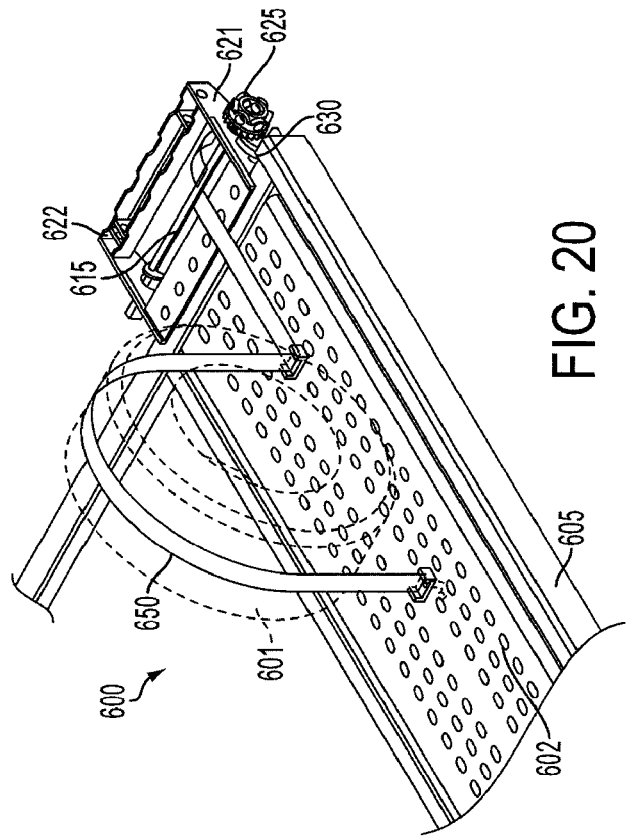
FIG. 20

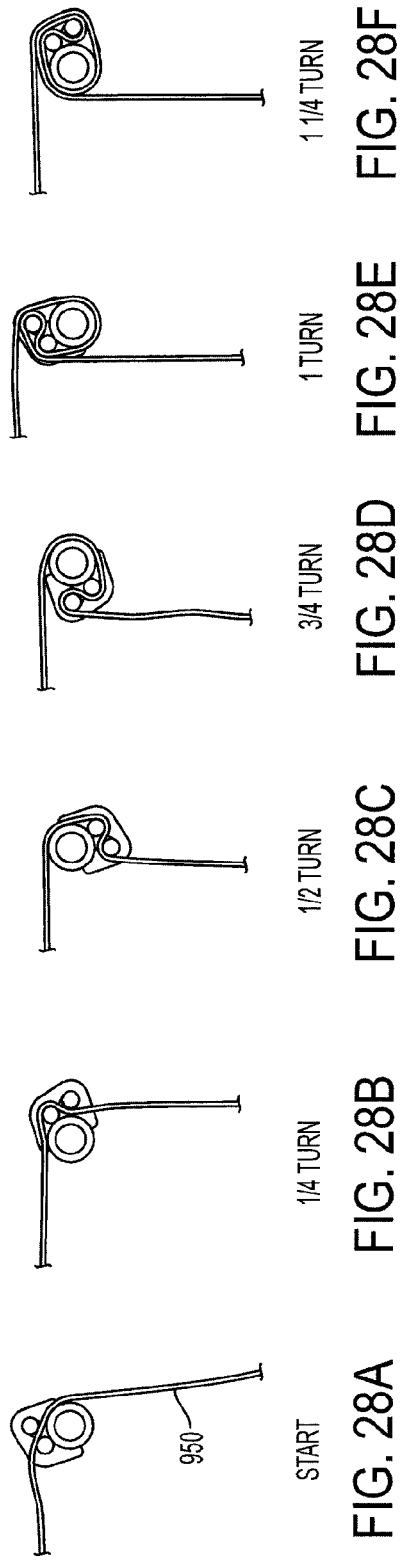

METHOD FOR RETROFITTING A CHAIN TIE DOWN SYSTEM TO PARALLEL SHAFT STRAP TIE DOWN SYSTEM

CROSS-REFERENCE TO RELATED APPLICATIONS

This application is a continuation-in-part of U.S. patent application Ser. No. 12/025,417, filed Feb. 4, 2008, the disclosure of which is incorporated by reference herein in its entirety. This application also claims the benefits of the legally related U.S. Provisional Patent Application Ser. No. 61/151,954 filed Feb. 12, 2009, which is fully incorporated herein by reference.

BACKGROUND

The present invention relates generally to automobile and cargo transport, and more particularly, to method for retrofitting a chain tie down system to a strap tie down system.

FIG. 1 illustrates a prior art vehicle transport trailer 100. Several vehicles 105 can be transported on the trailer. Each of the vehicles typically has its own platform 110 onto which each vehicle 105 is secured. Many vehicle manufacturers have specified chains as the allowable securement device when transporting their vehicles. Consequently, many vehicle transport trailers in active service are designed for and equipped with chain tie downs as illustrated in FIG. 2 that illustrates a side view of a prior art vehicle trailer tie down system 101. As previously described, each vehicle 105 is secured to its platform 110. FIG. 2 illustrates the vehicle 105 tied to its platform 110 by chains 115 in a "V" arrangement. Those skilled in the art understand that the chains 115 can be tied in other arrangements such as an "A" arrangement. The vehicle 105 is typically restrained to the platform 110, and therefore the trailer, by connecting the chains 115 to the frame of the vehicle 105 and the platform 110 or other part of the trailer. The chains 115 are placed in tension to prevent movement and are tightened in opposite directions to prevent the vehicle 105 from shifting front to back or vice versa. Currently, locking mechanisms 120 are used to keep the chain 115 from loosening due to forces acting upon the vehicle 105 (e.g. gravity, centripetal and other forces asserted on the vehicle 105 from the trailer or otherwise). There are many types of mechanisms 120 such as ratchet and clamping devices that are typically manually tightened by the driver of the trailer. The chains 115 may have to be routed around the idlers 125 in order to achieve the proper chain angle and chain direction.

Many vehicle manufacturers are now allowing their vehicles to be shipped secured by either chain or strap tie downs. Still other vehicle manufacturers have gone to wheel strap tie down as the only approved vehicle securement method.

In light of the trend toward strap tie down equipment combined with the majority of fleet equipment in service being configured for chain, it would be desirable to have an economical way of converting a chain tie down transport trailer to a wheel strap tie down transport trailer. This would allow vehicle transportation companies to use existing transport trailers and possibly not have to purchase new transport trailers.

FIG. 3A illustrates a typical "open" chain tie down shaft system showing a chain 115 secured to a vehicle 105 (with one wheel 102 shown). FIG. 3B illustrates a typical "enclosed" chain tie down a chain 115 secured to a vehicle 105 (with one wheel 102 shown). A shaft enclosure 106 is also shown.

Previous procedures for retrofitting the chain tie down mechanism to strap tie down included connecting a wheel strap to the end of an existing chain, routing the chain 115 around a deck idler 107 and back to the strap 150 as illustrated in FIG. 3C. Previous procedures for retrofitting the chain tie down mechanism to strap tie down have further included welding a rigid rod 140 parallel to the original shaft 116, spaced away from the original shaft 116 as illustrated in FIGS. 3D and 3E. This arrangement results in a fixed gap through which a strap can be passed. The rigid rod 140 can be prone to permanently deflect, so intermediate spacers are added 141, which results in an incrementally adjustable strap as opposed to an infinitely adjustable strap.

BRIEF SUMMARY

Exemplary embodiments include a method for retrofitting a chain tie down apparatus to a strap tie down apparatus, the chain tie down apparatus having a central shaft, the method including affixing a first parallel shaft adjacent the central shaft and affixing shaft plates to the central shaft, wherein the first parallel shaft is radially moveable with respect to the central shaft.

Additional exemplary embodiments include a strap tie-down apparatus, including a central shaft, a first parallel shaft affixed to the central shaft via shaft plates that have been welded to the central shaft and a second parallel shaft welded to the central shaft, wherein the first parallel shaft is moveable with respect to the central shaft via the shaft plates.

Other systems and/or methods according to embodiments will be or become apparent to one with skill in the art upon review of the following drawings and detailed description. It is intended that all such additional systems and/or methods be included within this description, be within the scope of the exemplary embodiments, and be protected by the accompanying claims.

BRIEF DESCRIPTION OF DRAWINGS

Referring now to the drawings wherein like elements are numbered alike in the several FIGURES:

FIG. 3B illustrates a top perspective view of a prior art enclosed chain tie down system;

FIG. 4 illustrates a perspective view of an exemplary embodiment of a parallel shaft strap tie down system;

FIG. 4A illustrates a perspective view of a ratchet wheel;

FIG. 5 illustrates a top down view of the parallel shaft strap tie down system of FIG. 4;

FIG. 6 illustrates a side view of the central shaft and shaft plates of FIG. 5;

FIGS. 7A-7F illustrate a wrap sequence of the parallel shaft strap tie down apparatus of FIGS. 5-6 in accordance with exemplary embodiments;

FIG. 9 illustrates a top down view of another embodiment of a parallel shaft strap tie down apparatus of FIG. 8;

FIG. 10 illustrates a side view of the central shaft and the U-shaft of FIG. 9;

FIGS. 11A-11F illustrate a wrap sequence of the parallel shaft strap tie down apparatus of FIGS. 9-10 in accordance with exemplary embodiments;

FIGS. 14A-14C illustrate side views of the central shaft and shaft plates of FIG. 13;

FIGS. 15A-15F illustrate a wrap sequence of the parallel shaft strap tie down apparatus of FIGS. 12-14C in accordance with exemplary embodiments;

FIGS. 17A-17B illustrate views of the parallel shaft strap tie down system of FIG. 16;

FIG. 18A-18C illustrate side views of the central shaft and shaft plates of FIGS. 17A-17B;

FIGS. 19A-19F illustrate a wrap sequence of the parallel shaft strap tie down apparatus of FIGS. 16-18C in accordance with exemplary embodiments;

FIG. 20 illustrates a perspective view of an exemplary embodiment of a parallel shaft strap tie down system;

FIGS. 28A-28F illustrate a wrap sequence of the parallel shaft strap tie down apparatus of FIGS. 26-27B in accordance with exemplary embodiments.

Figure 1:
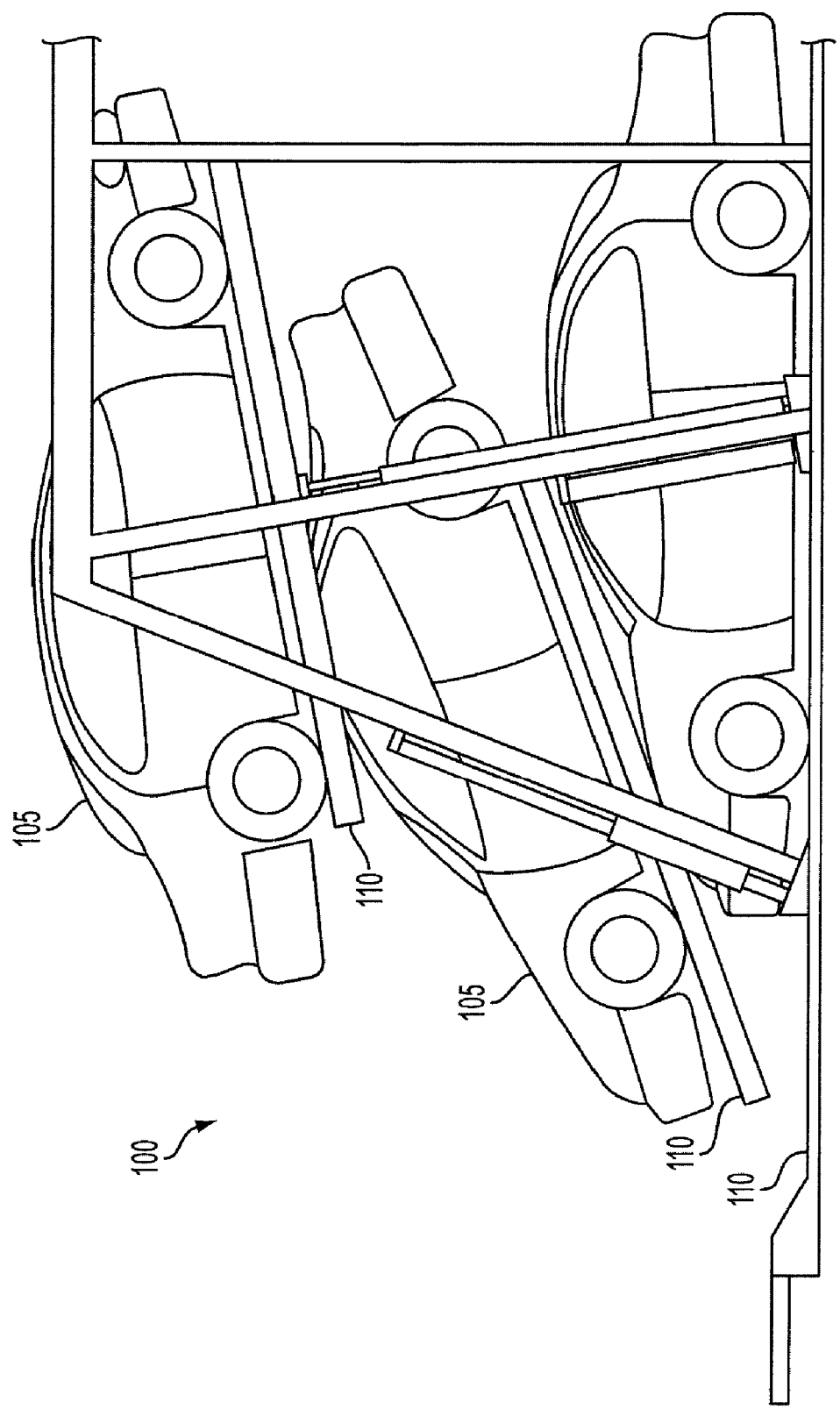
FIG. 1 illustrates a prior art vehicle transport trailer.
Figure 2:
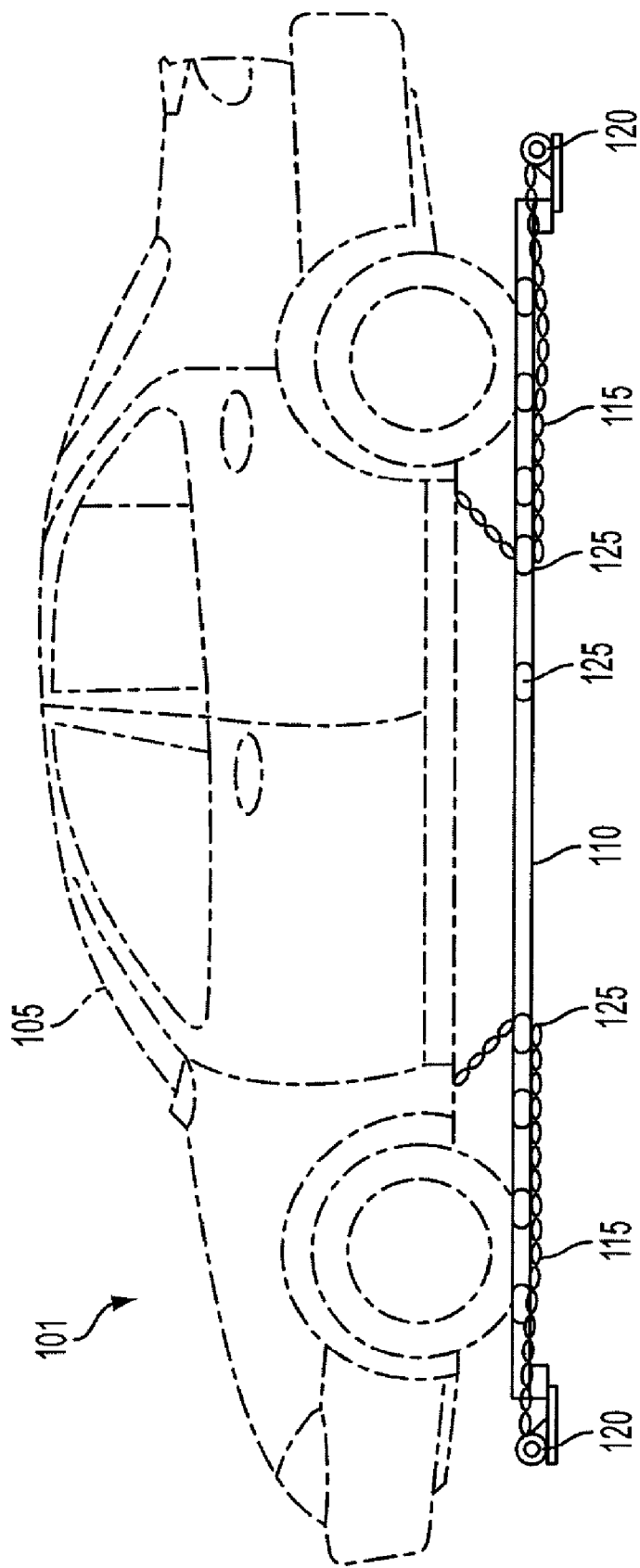
FIG. 2 illustrates a side view of a prior art vehicle trailer tie down system.

The detailed description explains the exemplary embodiments, together with advantages and features, by way of example with reference to the drawings.

DETAILED DESCRIPTION OF EXEMPLARY EMBODIMENTS

Exemplary embodiments include methods for retrofitting chain tie down systems to a parallel shaft strap tie down systems. In exemplary embodiments, retrofit methods convert a chain tie down shaft into a parallel shaft strap tie down system for both open tie down shaft systems and enclosed tie down shaft systems as described herein. The retrofit methods described herein avoid costs associated with new shafts, castings and weldments, while preserving the infinite adjustability and self locking action as described herein.

Several embodiments of parallel shaft strap tie down systems are now described. It is to be appreciated that the embodiments of the parallel shaft tie down systems can be fitted to existing chain tie down systems implementing the exemplary retrofitting methods described here.

FIG. 4 illustrates a perspective view of an exemplary embodiment of a parallel shaft strap tie down system 200. The system 200 includes a platform 205 with a parallel shaft strap tie-down apparatus 210 coupled to the platform 205. FIG. 5 illustrates a top down view of the parallel shaft strap tie down apparatus 210 of FIG. 4. The apparatus 210 includes a central shaft 215 that is free to rotate with respect to the platform 205, and disposed in between support plates 221, 222. The apparatus 210 includes a ratchet wheel 225 having wrench apertures 226 into which a tightening bar can be inserted to tighten the ratchet wheel as known in the art. The ratchet wheel 225 further includes engagement teeth 227 for engagement with a pawl 235 as known in the art. The ratchet wheel 225 is coupled to the central shaft 215 with a central axis 216 of the central shaft 215 concentric with an axis 228 of the ratchet wheel 225. In exemplary embodiments, the central shaft 215 can have a circular or non-circular (e.g., hexagonal) cross section.

In exemplary embodiments, shaft plates 230 are coupled to the central shaft 215. In exemplary embodiments, the shaft plates 230 are coupled to the central shaft 215 orthogonally (e.g., perpendicular to the central shaft 215). FIG. 6 illustrates a side view of the central shaft 215 and shaft plates 230 of FIG. 5. The shaft plates 230 include slots 231. A parallel shaft 240 is positioned parallel to the central shaft 215 and is constrained by the slots 231. The parallel shaft includes a central portion 241 and ends 242, which are positioned within the slots 231. In exemplary embodiments, a radius of the central portion 241 is greater that a radius of the ends 242 and of the slots 231. In addition, the central portion 241 is concentric with the ends 242. In exemplary embodiments, the radius of the slots 231 is greater than the radius of the ends 242. In this way, the parallel shaft 240 can be in contact with the central shaft 215 or spaced away from the central shaft 215, depending on the position of the parallel shaft 240 within the slots 231. In exemplary embodiments, a strap 250 is confined to a space 245 between the shaft plates 230 laterally and the central shaft 215 and parallel shaft 240 radially. In exemplary embodiments, rotation of the central shaft 215 causes the parallel shaft 240 to pinch down on the strap 250, resulting in a self-tightening action. A winch end of the strap 250 is continuously adjustable. Ends of the strap 250 around the wheel 201 are incrementally adjustable in a series of slots 202 in the platform 205. In exemplary embodiments, a fixed hook 255 and an intermediate hook 260 can be placed in the appropriate slot 202 when positioning the wheel 201 on the platform prior to tightening the strap 250.

FIGS. 7A-7F illustrate a wrap sequence of the apparatus 210 as described herein. In a start position the strap 250 is positioned between the central shaft 215 and the parallel shaft 240. In the start position the parallel shaft 240 rests on the strap 250 that rests on the central shaft 215. In a ¼ turn, the parallel shaft 240 may begin to move within the slots 231 and away from the strap 250 and the central shaft 215. In a ½ turn, the parallel shaft 240 falls under the force of gravity from the strap 250 and the central shaft 215. In a ¾ turn, the parallel shaft 240 may begin to move toward the strap 250 and the central shaft 215 once again. In a full turn, the strap 250 comes into contact with itself and the parallel shaft 240 falls against the strap and the central shaft 215 under the force of gravity and a tension force of the strap in its self-tightening response between the central shaft 215 and the parallel shaft 240. Subsequent turns such as a 1¼ turn further tighten the strap 250 onto the central shaft 215 and parallel shaft 240.

Figure 8:
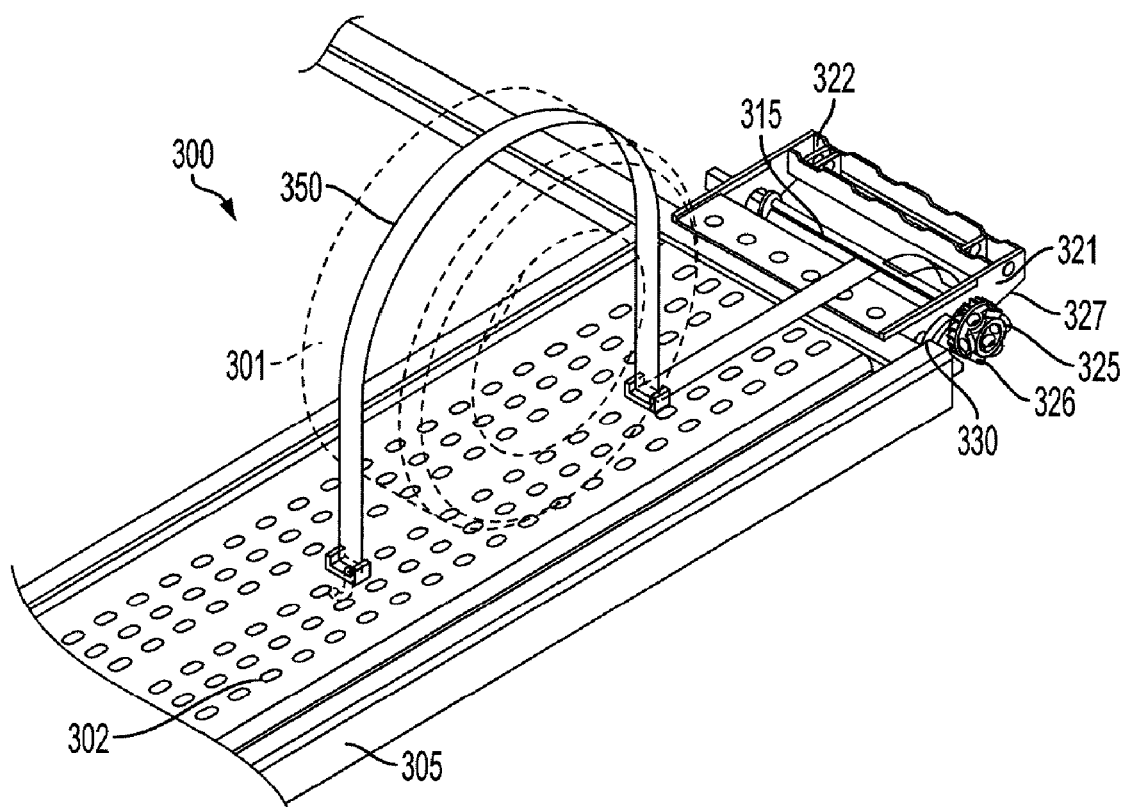
FIG. 8 illustrates a perspective view of an exemplary embodiment of a parallel shaft strap tie down system.

FIG. 8 illustrates a perspective view of an exemplary embodiment of a parallel shaft strap tie down system 300. The system 300 includes a platform 305 with a parallel shaft strap tie-down apparatus 310 coupled to the platform 305. FIG. 9 illustrates a top down view of the parallel shaft strap tie down apparatus 310 of FIG. 8. The apparatus 310 includes a central shaft 315 that is free to rotate with respect to the platform 300, and in between support plates 321, 322. The apparatus 310 includes a ratchet wheel 325 having wrench apertures 326 into which a tightening bar can be inserted to tighten the ratchet wheel as known in the art. The ratchet wheel 325 further includes engagement teeth 327 for engagement with a pawl 335 as known in the art. The ratchet wheel 325 is coupled to the central shaft 315. In exemplary embodiments, the central shaft 315 can have a circular or non-circular (e.g., hexagonal) cross section.

FIG. 9 illustrates a view of another embodiment of a parallel shaft strap tie down apparatus. The apparatus includes a central shaft 315 oriented about a central axis 316 and disposed in between support plates 321, 322. The apparatus includes a ratchet wheel 325 having wrench apertures 326 into which a tightening bar can be inserted to tighten the ratchet wheel as known in the art. The ratchet wheel 325 further includes engagement teeth 327 for engagement with a pawl 335 as known in the art. The ratchet wheel 325 is coupled to the central shaft 315 with a central axis 316 of the central shaft 315 concentric with an axis 328 of the ratchet wheel 325. In exemplary embodiments, the central shaft 315 can have a circular or non-circular (e.g., hexagonal) cross section. In exemplary embodiments, shaft holes 330 are spaced on the central shaft 315. An elongated U-shaft 340 having middle leg 341 and end legs 342 is positioned with respect to the central shaft 315. In an exemplary embodiment, the middle leg 341 is positioned parallel to the central shaft 315 and the end legs are positioned within the shaft holes 330. FIG. 10 illustrates a side view of the central shaft 315 and the U-shaft 340 of FIG. 9. In exemplary embodiments, the middle leg 341 and ends legs are contiguous, thereby forming a contiguous U-shape. In exemplary embodiments, the end legs 342 can be threaded and affixed with nuts 343 to fix the U-shaft 340 to the central shaft 315. In this way, the middle leg 341 can be in contact with the central shaft 315 or spaced away from the central shaft 315, which is generally dependent on the length of the end legs 342. It is appreciated that the length of the end legs 342 determines a width of a space 345 between the central shaft 315 and the middle leg 341. In exemplary embodiments, a strap 350 is confined to the space 345 between the end legs 342 laterally and the central shaft 315 and middle leg 341 radially. In exemplary embodiments, rotation of the central shaft 315 causes the middle leg 341 to pinch down on the strap 350, resulting in a self-tightening action. A winch end of the strap 350 is continuously adjustable. Ends of the strap 350 around the wheel 301 are incrementally adjustable in a series of slots 302 in the platform 305. In exemplary embodiments, a fixed hook 355 and an intermediate hook 360 can be placed in the appropriate slot 302 when positioning the wheel 301 on the platform prior to tightening the strap 350.

FIGS. 11A-11F illustrate a wrap sequence of the apparatus 310 as described herein. In a start position the strap 350 is positioned between the central shaft 315 and the middle leg 341. In the start position the middle leg 341 rests on the strap 350 that rests on the central shaft 315. In a ¼ turn, the end legs 342 may begin to move within the shaft holes 330 and away from the strap 350 and the central shaft 315. In a ½ turn, the middle leg 341 falls under the force of gravity from the strap 350 and the central shaft 315. In a ¾ turn, the middle leg 341 may begin to move toward the strap 350 and the central shaft 315 once again (and the end legs shifting within the shaft holes 330). In a full turn, the strap 350 comes into contact with itself and the middle leg 341 falls against the strap and the central shaft 315 under the force of gravity and a tension force of the strap 350 in its self-tightening response between the central shaft 315 and the U-shaft 340. Subsequent turns such as a 1¼ turn further tighten the strap 350 onto the central shaft 315 and U-shaft 340.

Figure 12:
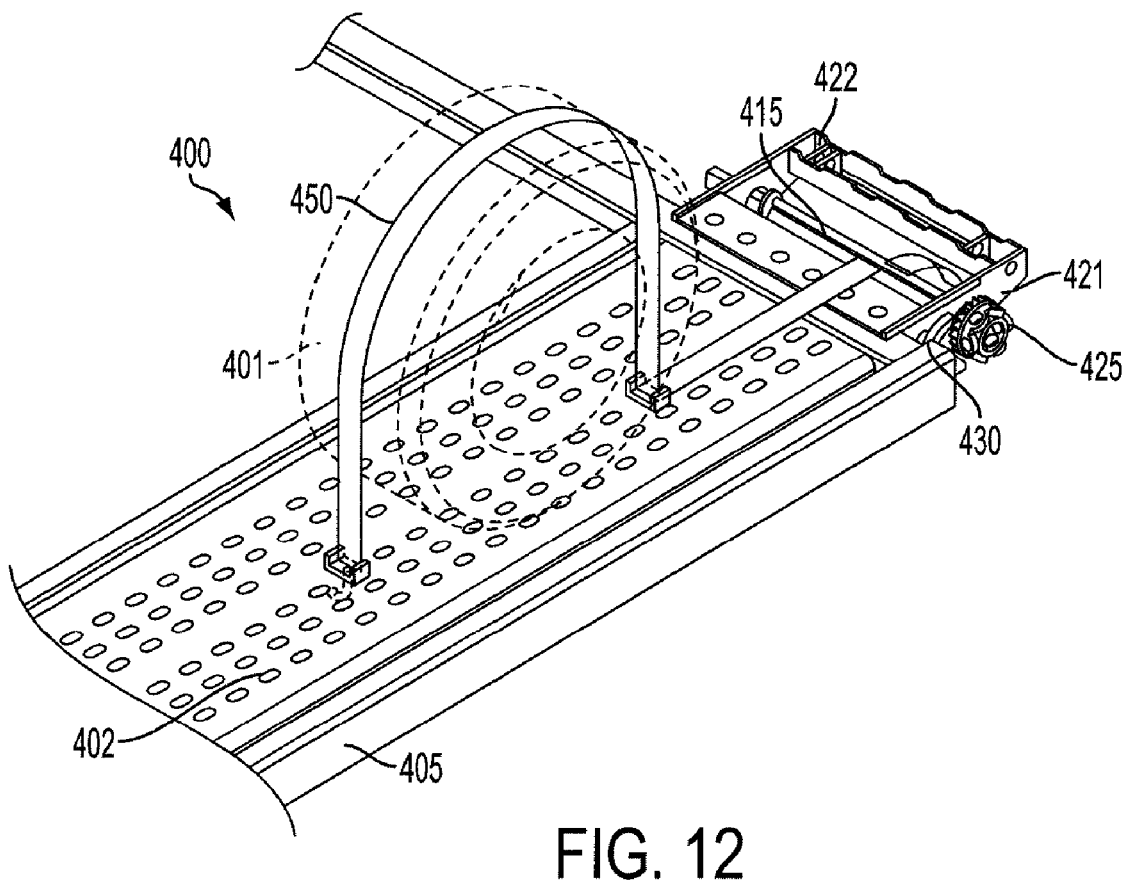
FIG. 12 illustrates a perspective view of an exemplary embodiment of a parallel shaft strap tie down system.
Figure 13:
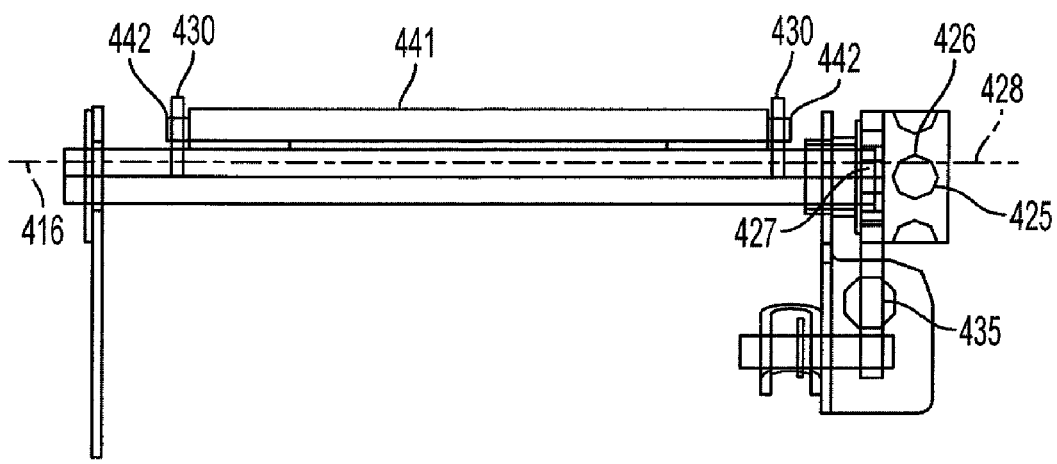
FIG. 13 illustrates a view of the parallel shaft strap tie down system of FIG. 12.

FIG. 12 illustrates a perspective view of an exemplary embodiment of a parallel shaft strap tie down system 400. The system 400 includes a platform 405 with a parallel shaft strap tie-down apparatus 410 coupled to the platform 400. FIG. 13 illustrates a top down view of the parallel shaft strap tie down apparatus 410 of FIG. 4. The apparatus 410 includes a central shaft 415 that is free to rotate with respect to the platform 400, and in between support plates 421, 422. The apparatus 410 includes a ratchet wheel 425 having wrench apertures 426 into which a tightening bar can be inserted to tighten the ratchet wheel as known in the art. The ratchet wheel 425 further includes engagement teeth 427 for engagement with a pawl 435 as known in the art. The ratchet wheel 425 is coupled to the central shaft 415 with a central axis 416 of the central shaft 415 concentric with an axis 428 of the ratchet wheel 425. In exemplary embodiments, the central shaft 415 can have a circular or non-circular (e.g., hexagonal) cross section.

In exemplary embodiments, shaft plates 430 are coupled to the central shaft 415. In exemplary embodiments, the shaft plates 430 are coupled to the central shaft 415 orthogonally (e.g., perpendicular to the central shaft 215). FIG. 14 illustrates a side view of the central shaft 415 and shaft plates 430 of FIG. 13. The shaft plates 430 include holes 431. A parallel shaft 440 is positioned parallel to the central shaft 415 and is constrained by the holes 431. The parallel shaft includes a central portion 441 and ends 442, which are positioned within the holes 431. In exemplary embodiments, a radius of the central portion 441 is greater that a radius of the ends 442 and of the holes 431. In addition, the central portion 441 is not concentric with the ends 442. As such, an axis 443 of the central portion 441 is parallel with an axis 444 of the ends 442. In exemplary embodiments, the radius of the holes 431 is greater than the radius of the ends 442. In this way, the parallel shaft 440 can be in contact with the central shaft 415 or spaced away from the central shaft 415, depending on the position of the parallel shaft 440 within the holes 431. In exemplary embodiments, a strap 450 is confined to a space 445 between the shaft plates 430 laterally and the central shaft 415 and parallel shaft 440 radially. In exemplary embodiments, rotation of the central shaft 415 causes the parallel shaft 440 to pinch down on the strap 450, resulting in a self-tightening action. A winch end of the strap 450 is continuously adjustable. Ends of the strap 450 around the wheel 401 are incrementally adjustable in a series of slots 402 in the platform 405. In exemplary embodiments, a fixed hook 455 and an intermediate hook 460 can be placed in the appropriate slot 402 when positioning the wheel 401 on the platform prior to tightening the strap 450.

FIGS. 15A-15F illustrate a wrap sequence of the apparatus 410 as described herein. In a start position the strap 450 is positioned between the central shaft 415 and the parallel shaft 440. In the start position the parallel shaft 440 rests on the strap 450 that rests on the central shaft 415. In a ¼ turn, the parallel shaft 440 may begin to move within the slots 431 and away from the strap 450 and the central shaft 415. In a ½ turn, the parallel shaft 440 falls under the force of gravity from the strap 450 and the central shaft 415. In a ¾ turn, the parallel shaft 440 may begin to move toward the strap 450 and the central shaft 415 once again. In a full turn, the strap 450 comes into contact with itself and the parallel shaft 440 falls against the strap and the central shaft 415 under the force of gravity and a tension force of the strap in its self-tightening response between the central shaft 415 and the parallel shaft 440. Subsequent turns such as a 1¼ turn further tighten the strap 450 onto the central shaft 415 and parallel shaft 440.

Figure 16:
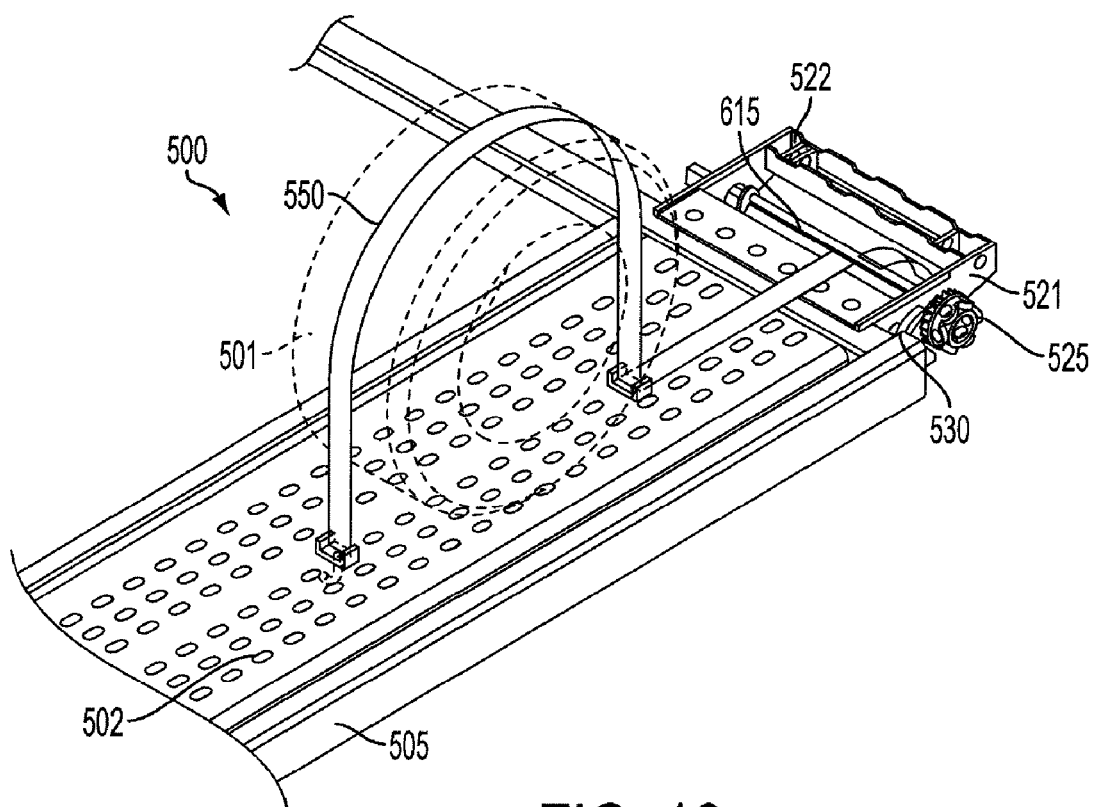
FIG. 16 illustrates a perspective view of an exemplary embodiment of a parallel shaft strap tie down system.

FIG. 16 illustrates a perspective view of an exemplary embodiment of a parallel shaft strap tie down system 500. The system 500 includes a platform 505 with a parallel shaft strap tie-down apparatus 510 coupled to the platform 505. FIG. 17 illustrates a top down view of the parallel shaft strap tie down apparatus 510 of FIG. 16. The apparatus 510 includes a central shaft 515 that is free to rotate with respect to the platform 505, and in between support plates 521, 522. The apparatus 510 includes a ratchet wheel 525 having wrench apertures 526 into which a tightening bar can be inserted to tighten the ratchet wheel as known in the art. The ratchet wheel 525 further includes engagement teeth 527 for engagement with a pawl 535 as known in the art. The ratchet wheel 525 is coupled to the central shaft 515 with a central axis 516 of the central shaft 515 concentric with an axis 528 of the ratchet wheel 525. In exemplary embodiments, the central shaft 515 can have a circular or non-circular (e.g., hexagonal) cross section.

In exemplary embodiments, shaft plates 530 are coupled to the central shaft 515. In exemplary embodiments, the shaft plates 530 are coupled to the central shaft 515 orthogonally (e.g., perpendicular to the central shaft 515). FIG. 18 illustrates a side view of the central shaft 515 and shaft plates 530 of FIG. 17. The shaft plates 530 include holes 531. A parallel shaft 540 is positioned parallel to the central shaft 515 and is constrained by the holes 531. The parallel shaft includes a central portion 541 and ends 542, which are positioned within the holes 531. Spacer bars 546 are positioned between the central portion 541 and the ends 542, thereby providing a separation between axes 543, 544 of the central portion 541 and the ends 542, respectively. In exemplary embodiments, a radius of the central portion 541 is greater that a radius of the ends 542 and of the holes 531. In addition, the central portion 541 is not concentric with the ends 542. As such, the axis 543 of the central portion 541 is parallel with the axis 544 of the ends 542. In exemplary embodiments, the radius of the holes 531 is approximately equal to the radius of the ends 542. As such, the ends 542 rotate within the holes 531. In this way, the parallel shaft 540 can be in contact with the central shaft 515 or spaced away from the central shaft 515, depending on the rotation of the parallel shaft 540 within the holes 531, the spacing being determined by the rotation of the spacer bars 546. In exemplary embodiments, a strap 550 is confined to a space 545 between the shaft plates 530 laterally and the central shaft 515 and parallel shaft 540 radially. In exemplary embodiments, rotation of the central shaft 515 causes the parallel shaft 540 to pinch down on the strap 550, resulting in a self-tightening action. A winch end of the strap 550 is continuously adjustable. Ends of the strap 550 around the wheel 501 are incrementally adjustable in a series of slots 502 in the platform 505. In exemplary embodiments, a fixed hook 555 and an intermediate hook 560 can be placed in the appropriate slot 502 when positioning the wheel 501 on the platform prior to tightening the strap 550.

FIGS. 19A-19F illustrate a wrap sequence of the apparatus 510 as described herein. In a start position the strap 550 is positioned between the central shaft 515 and the parallel shaft 540. In the start position the parallel shaft 540 rests on the strap 550 that rests on the central shaft 515. In a ¼ turn, the parallel shaft 540 may begin to move within the slots 531 and away from the strap 550 and the central shaft 515. In a ½ turn, the parallel shaft 540 falls under the force of gravity from the strap 550 and the central shaft 515. In a ¾ turn, the parallel shaft 540 may begin to move toward the strap 550 and the central shaft 515 once again. In a full turn, the strap 550 comes into contact with itself and the parallel shaft 540 falls against the strap and the central shaft 515 under the force of gravity and a tension force of the strap in its self-tightening response between the central shaft 515 and the parallel shaft 540. Subsequent turns such as a 1¼ turn further tighten the strap 550 onto the central shaft 515 and parallel shaft 540.

Figure 21:
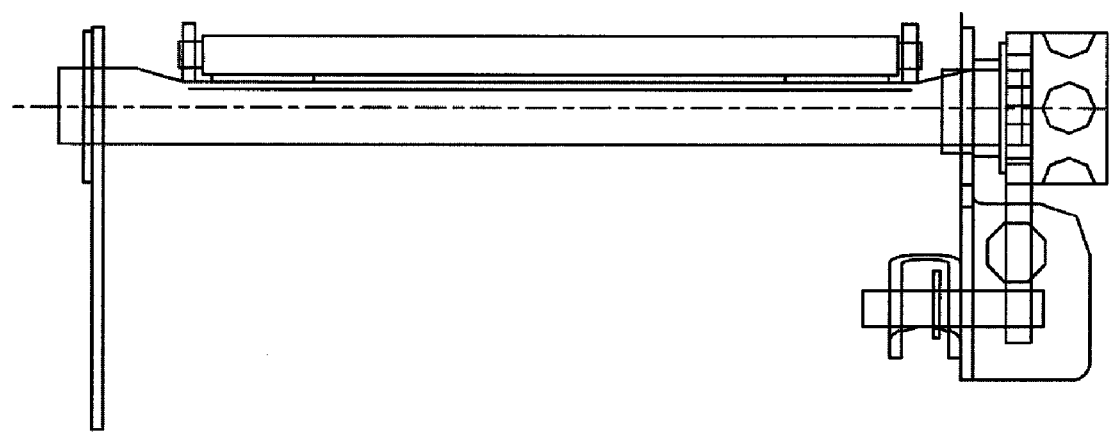
FIG. 21 illustrates a top down view of the parallel shaft strap tie down system of FIG. 20.

FIG. 20 illustrates a perspective view of an exemplary embodiment of a parallel shaft strap tie down system 600. The system 600 includes a platform 605 with a parallel shaft strap tie-down apparatus 610 coupled to the platform 605. FIG. 21 illustrates a top down view of the parallel shaft strap tie down apparatus 610 of FIG. 20. The apparatus 610 includes a central shaft 615 that is free to rotate with respect to the platform 605, and in between support plates 621, 622. The apparatus 610 includes a ratchet wheel 625 having wrench apertures 626 into which a tightening bar can be inserted to tighten the ratchet wheel as known in the art. The ratchet wheel 625 further includes engagement teeth 627 for engagement with a pawl 635 as known in the art. The ratchet wheel 625 is coupled to the central shaft 615 with a central axis 616 of the central shaft 615 concentric with an axis 628 of the ratchet wheel 625. In exemplary embodiments, the central shaft 615 can have a circular or non-circular (e.g., hexagonal) cross section.

Figure 22:
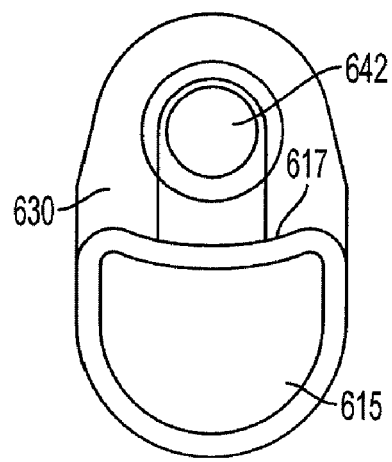
FIG. 22 illustrates a side view of the central shaft and shaft plates of FIG. 21.
Figure 23:
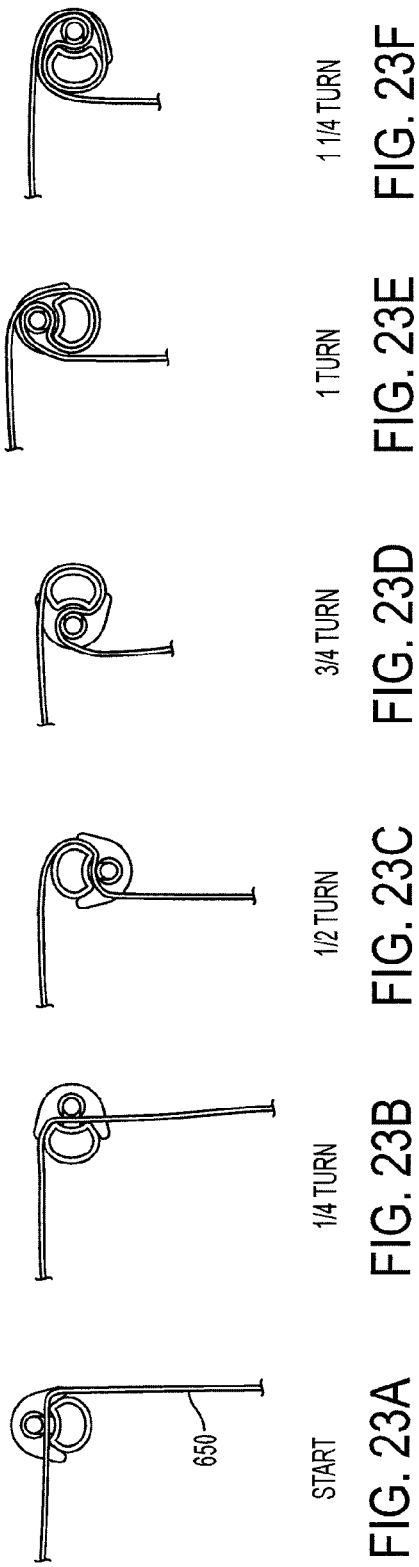
FIGS. 23A-23F illustrate a wrap sequence of the parallel shaft strap tie down apparatus of FIGS. 20-22 in accordance with exemplary embodiments.

In exemplary embodiments, shaft plates 630 are coupled to the central shaft 615. In exemplary embodiments, the shaft plates 630 are coupled to the central shaft 615 orthogonally (e.g., perpendicular to the central shaft 615). FIG. 22 illustrates a side view of the central shaft 615 and shaft plates 630 of FIG. 21. The shaft plates 630 include slots 631. A parallel shaft 640 is positioned parallel to the central shaft 615 and is constrained by the slots 631. The parallel shaft includes a central portion 641 and ends 642, which are positioned within the slots 631. In exemplary embodiments, a radius of the central portion 641 is greater that a radius of the ends 642 and of the slots 631. In addition, the central portion 641 is concentric with the ends 642. In exemplary embodiments, the radius of the slots 631 is greater than the radius of the ends 642. In this way, the parallel shaft 640 can be in contact with the central shaft 615 or spaced away from the central shaft 615, depending on the position of the parallel shaft 640 within the slots 631. In exemplary embodiments, a strap 650 is confined to a space 645 between the shaft plates 630 laterally and the central shaft 615 and parallel shaft 640 radially. In exemplary embodiments, rotation of the central shaft 615 causes the parallel shaft 640 to pinch down on the strap 650, resulting in a self-tightening action. A winch end of the strap 650 is continuously adjustable. Ends of the strap 650 around the wheel 601 are incrementally adjustable in a series of slots 602 in the platform 605. In exemplary embodiments, a fixed hook 655 and an intermediate hook 660 can be placed in the appropriate slot 602 when positioning the wheel 601 on the platform prior to tightening the strap 650. As further illustrated in FIGS. 21 and 22, in exemplary embodiments, the central shaft 615 can further include an elongated depression 617. In exemplary embodiments, the shape of the elongated depression 617 approximately matches the shape of the parallel shaft 640. The parallel shaft 640 can contact the central shaft 615 in the elongated depression 617 when at its closest proximity in the slots 631. When at its furthest distance, the space 645 is formed that allows easy insertion of the strap 650 between the central shaft 615 and the parallel shaft 640. The elongated depression 617 in the central shaft 615 can further provide a smaller radial envelope when tightening the entire assembly, as compared to the central shaft 615 without the elongated depression 617. The elongated depression 617 can further provide improved contact and self-tightening action between the central shaft 615 and the parallel shaft 640 as compared with a central shaft 615 without the elongated depression 617. The mating of the parallel shaft to the depression in the main shaft further contributes to the strength and stiffness of the main shaft FIGS. 23A-23F illustrate a wrap sequence of the apparatus 610 as described herein. In a start position the strap 650 is positioned between the central shaft 615 and the parallel shaft 640. In the start position the parallel shaft 640 rests on the strap 650 that rests on the central shaft 615. In a ¼ turn, the parallel shaft 640 may begin to move within the slots 631 and away from the strap 650 and the central shaft 615. In a ½ turn, the parallel shaft 640 falls under the force of gravity from the strap 650 and the central shaft 615. In a ¾ turn, the parallel shaft 640 may begin to move toward the strap 650 and the central shaft 615 once again. In a full turn, the strap 650 comes into contact with itself and the parallel shaft 640 falls against the strap and the central shaft 615 under the force of gravity and a tension force of the strap in its self-tightening response between the central shaft 215 and the parallel shaft 640. Subsequent turns such as a 1¼ turn further tighten the strap 650 onto the central shaft 615 and parallel shaft 640.

As described herein, conventional chain tie down systems can be retrofitted to the exemplary parallel shaft strap tie down systems as now further described with respect to a further exemplary parallel shaft tie down system.

Figure 24:
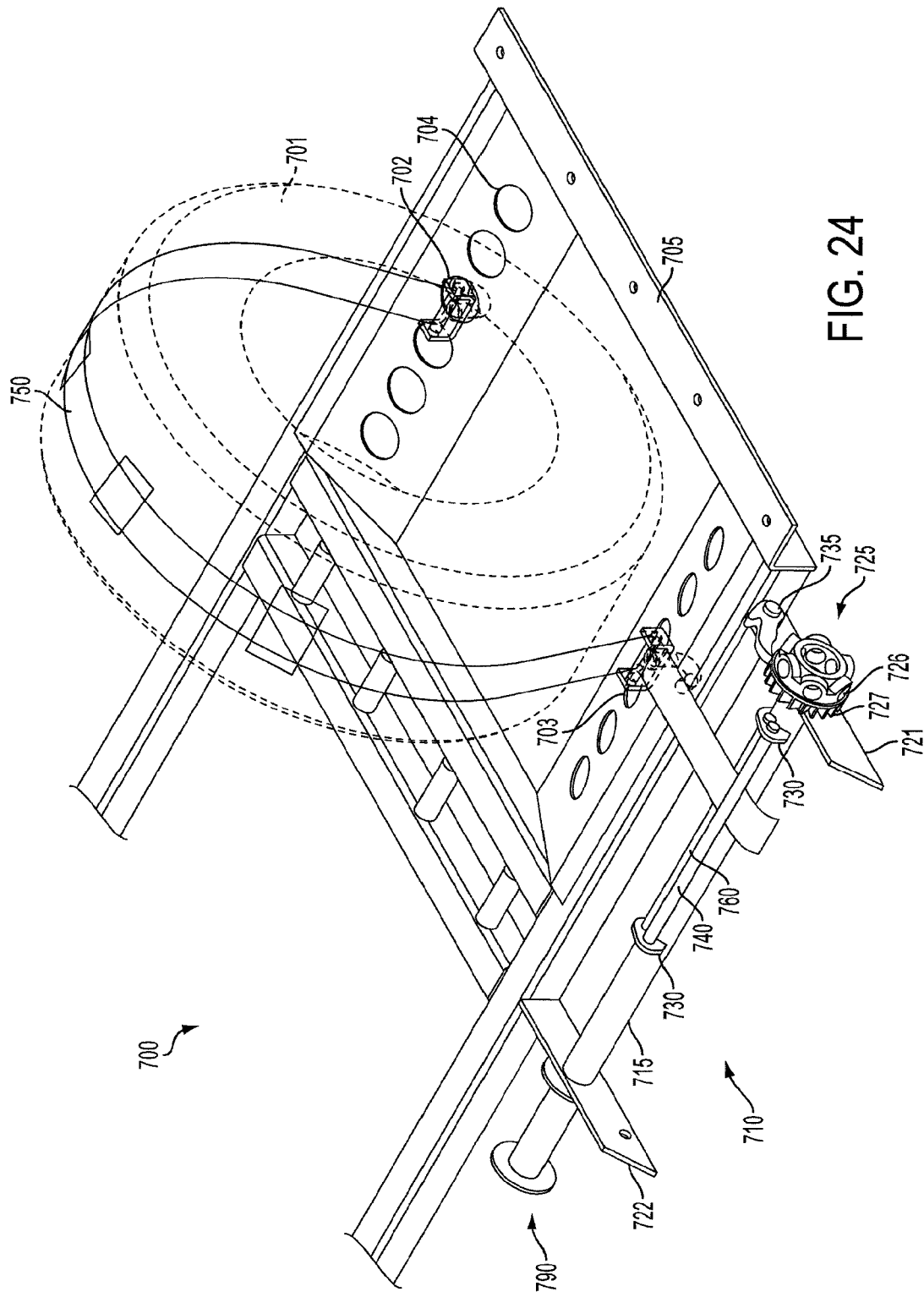
FIG. 24 illustrates a perspective view of an exemplary embodiment of a parallel shaft strap tie down system fitted from an open chain tie down in accordance with exemplary embodiments.

FIG. 24 illustrates a perspective view of an exemplary embodiment of a parallel shaft strap tie down system 700 fitted from an open chain tie down in accordance with exemplary embodiments. The system 700 includes a platform 705 with a parallel shaft strap tie-down apparatus 710 coupled to the platform 705. The apparatus 710 includes a central shaft 715 that is free to rotate with respect to the platform 705, and in between support plates 721, 722. The apparatus 710 includes a ratchet wheel 725 having wrench apertures 726 into which a tightening bar can be inserted to tighten the ratchet wheel as known in the art. The ratchet wheel 725 further includes engagement teeth 727 for engagement with a pawl 735 as known in the art. The ratchet wheel 725 is coupled to the central shaft 715 with a central axis of the central shaft 715 concentric with an axis of the ratchet wheel 725. In exemplary embodiments, the central shaft 715 can have a circular or non-circular (e.g., hexagonal) cross section. In the retrofitted state, the system 700 includes the original shaft extension onto which the prior chain was tightened. It is appreciated that the original central shaft 715, ratchet wheel 725, and pawl are functionally included in the retrofitted system 700. It is further appreciated that the shaft extension 790 is no longer used. However, a chain could still be implemented as desired. A first and second parallel shaft 740 760 are shown disposed between two shaft plates 730 as further described herein. FIG. 24 illustrates that the vehicle wheel 701 is secured to the platform 705 via a strap 750, and a fixed hook 702 and an intermediate hook 703, both the fixed hook 702 and the intermediate hook 703 placed in one of the multiple slots 704 on the platform 705. The strap 750 can then be routed through an intermediate hook 703 and can then be connected to a shaft 715 of the apparatus 710.

Figure 3A:
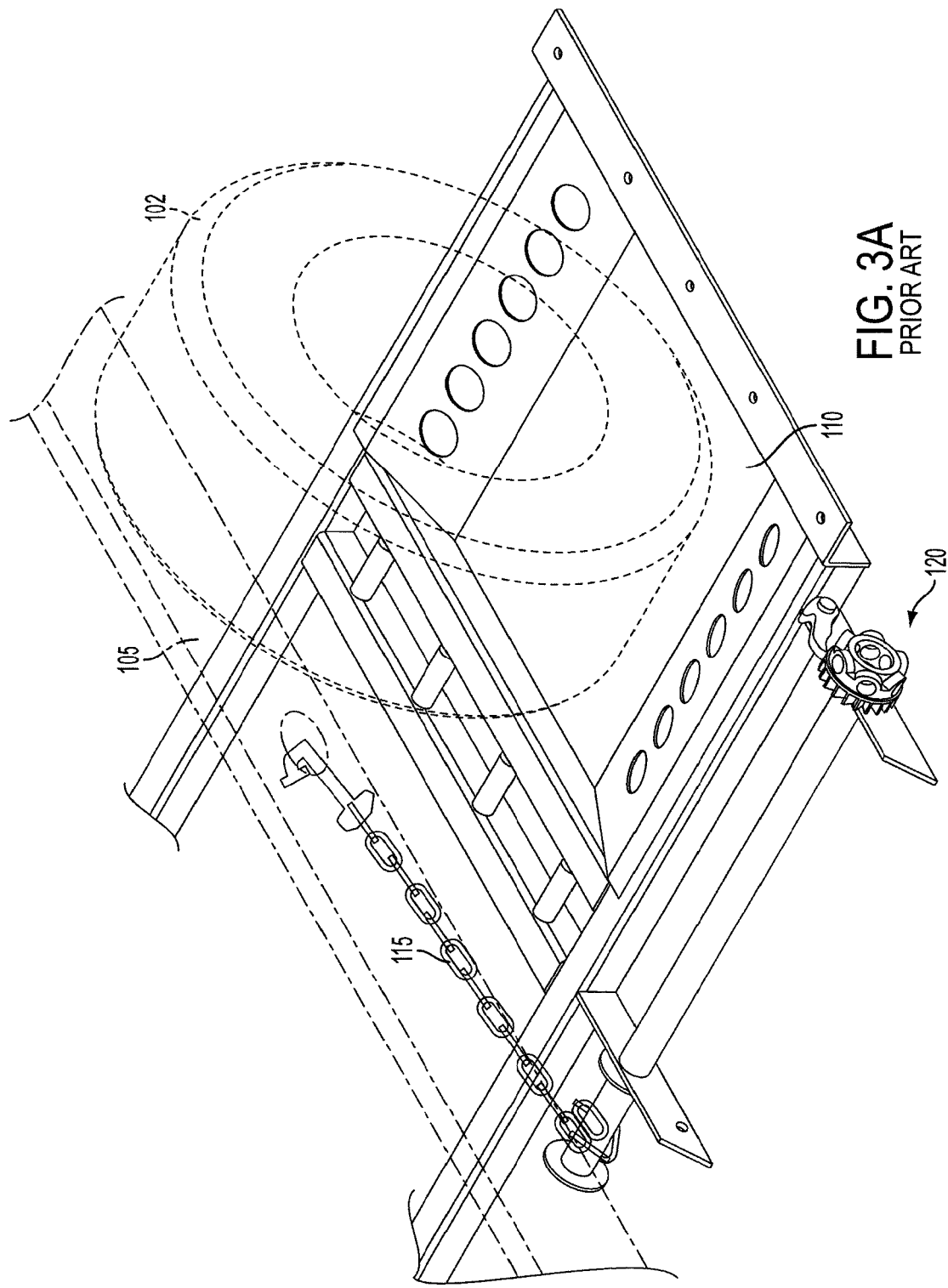
FIG. 3A illustrates a top perspective view of a prior art open chain tie down system.
Figure 3C:
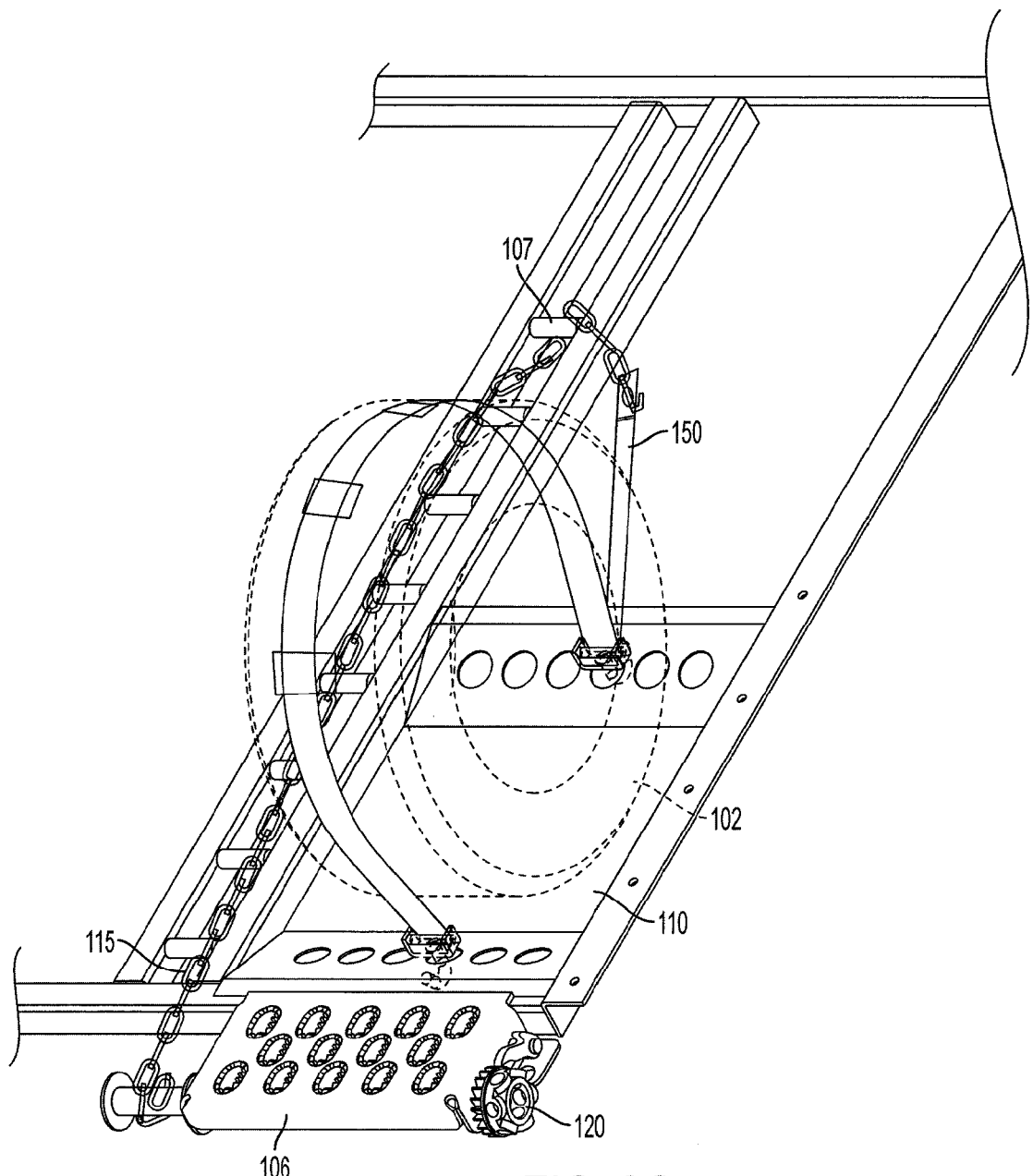
FIG. 3C illustrates a top perspective view of a prior art chain tie down system retrofitted to use strap tie downs.
Figure 3D:
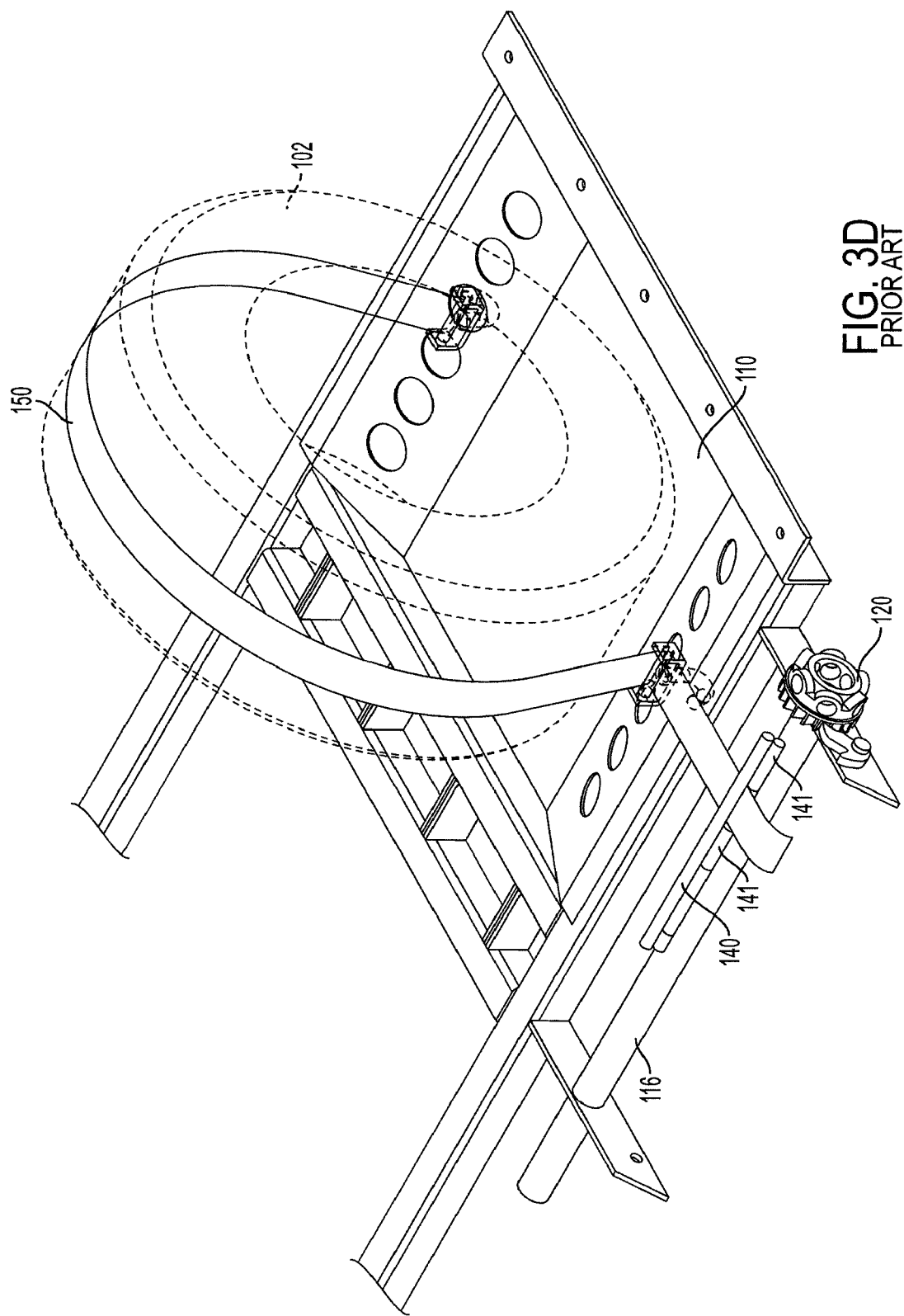
FIG. 3D illustrates a top perspective view of a prior art incrementally adjustable strap tie down system.
Figure 3E:
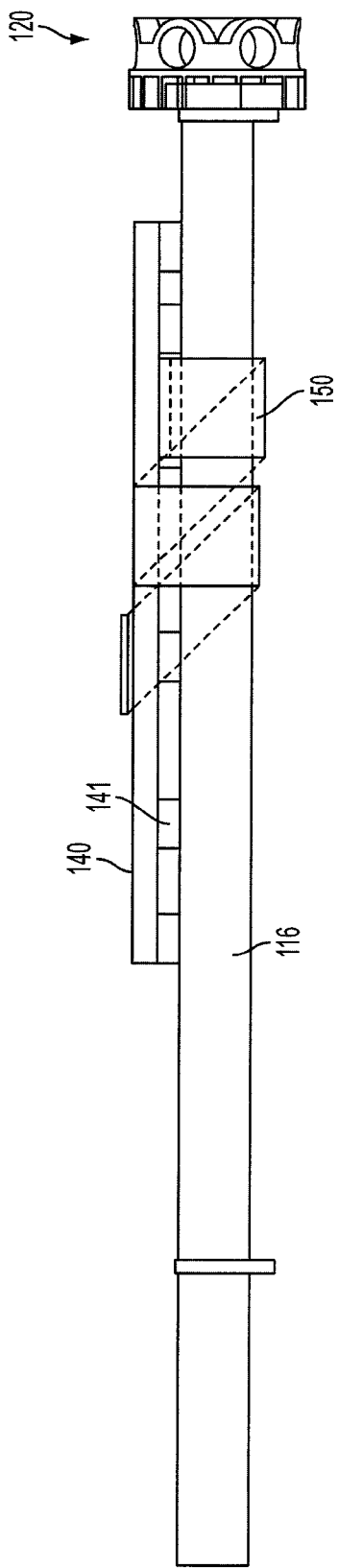
FIG. 3E illustrates a front view of the prior art shaft shown in FIG. 3D.
Figure 25:
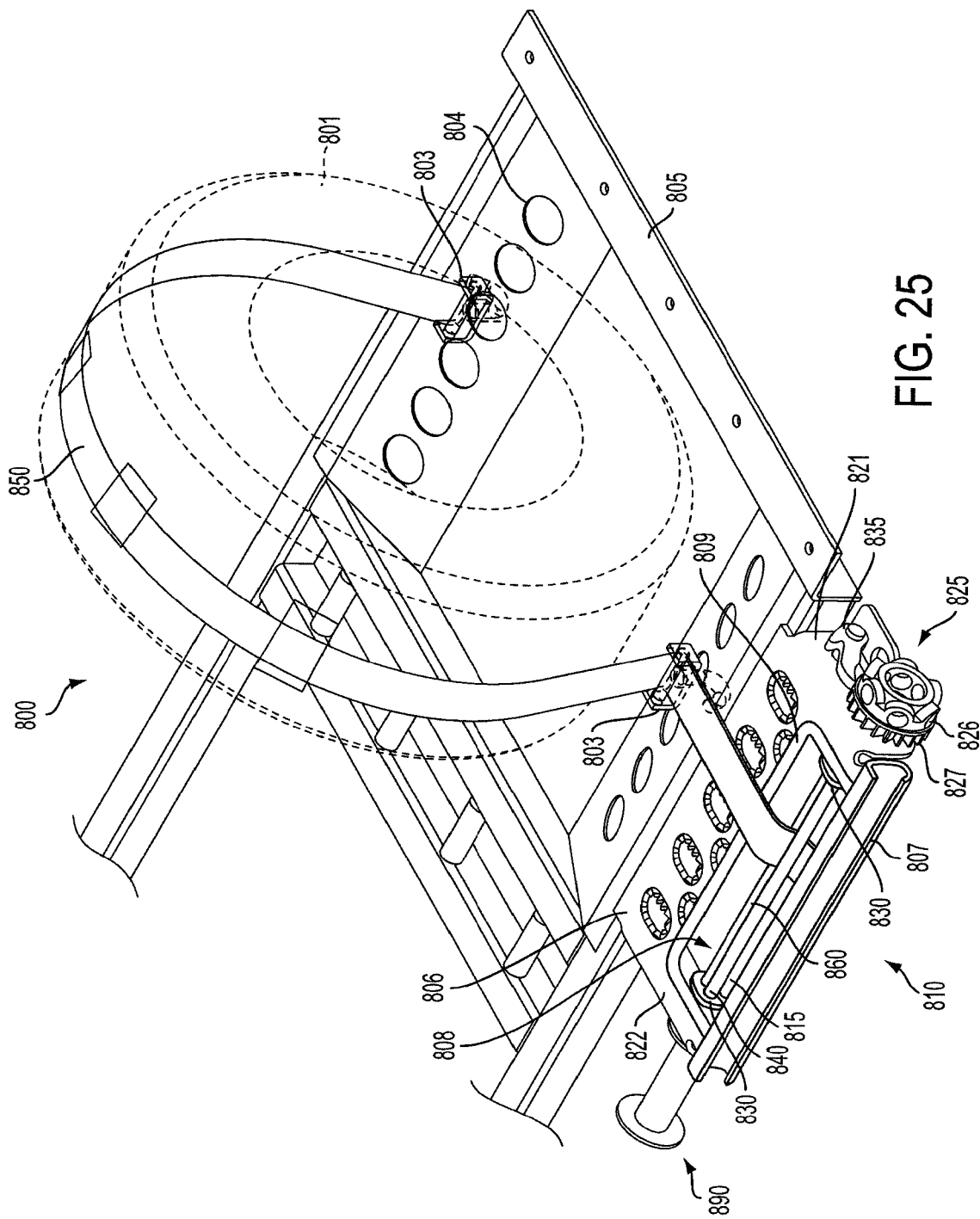
FIG. 25 illustrates a perspective view of an exemplary embodiment of a parallel shaft strap tie down system fitted from an enclosed chain tie down in accordance with exemplary embodiments.

FIG. 25 illustrates a perspective view of an exemplary embodiment of a parallel shaft strap tie down system 800 fitted from an enclosed chain tie down in accordance with exemplary embodiments. The system 800 includes a platform 805 with a parallel shaft strap tie-down apparatus 810 coupled to the platform 805. The apparatus 810 includes a central shaft 815 that is free to rotate with respect to the platform 805, and in between support plates 821, 822. The support plates 821, 822 are part of the original shaft enclosure 806 (similar to the enclosure shown in FIG. 3B). A front support plate 807 is affixed to the shaft enclosure 806 to provide support from the portion of the original enclosure that has been removed to create an aperture 808 to access the central shaft 815. The apparatus 810 includes a ratchet wheel 825 having wrench apertures 826 into which a tightening bar can be inserted to tighten the ratchet wheel as known in the art. The ratchet wheel 825 further includes engagement teeth 827 for engagement with a pawl 835 as known in the art. The ratchet wheel 825 is coupled to the central shaft 815 with a central axis of the central shaft 815 concentric with an axis of the ratchet wheel 825. In exemplary embodiments, the central shaft 815 can have a circular or non-circular (e.g., hexagonal) cross section. In the retrofitted state, the system 800 includes the original shaft extension onto which the prior chain was tightened. It is appreciated that the original central shaft 815, ratchet wheel 825, and pawl are functionally included in the retrofitted system 800. It is further appreciated that the shaft extension 890 is no longer used. However, a chain could still be implemented as desired. It is further appreciated that the enclosure 806 still functions to provide a drive-over support for vehicles loaded onto the platform 805. The front support plate 807 provides further support to bear weight of the vehicle as it is loaded onto the platform 805. A first and second parallel shaft 840, 860 are shown disposed between two shaft plates 830 as further described herein. FIG. 25 illustrates that the vehicle wheel 801 is secured to the platform 805 via a strap 850, and a fixed hook 802 and an intermediate hook 803, both the fixed hook 802 and the intermediate hook 803 placed in one of the multiple slots 804 on the platform 805. The strap 850 can then be routed through an intermediate hook 803 and can then be connected to a shaft 815 of the apparatus 810.

Figure 26:
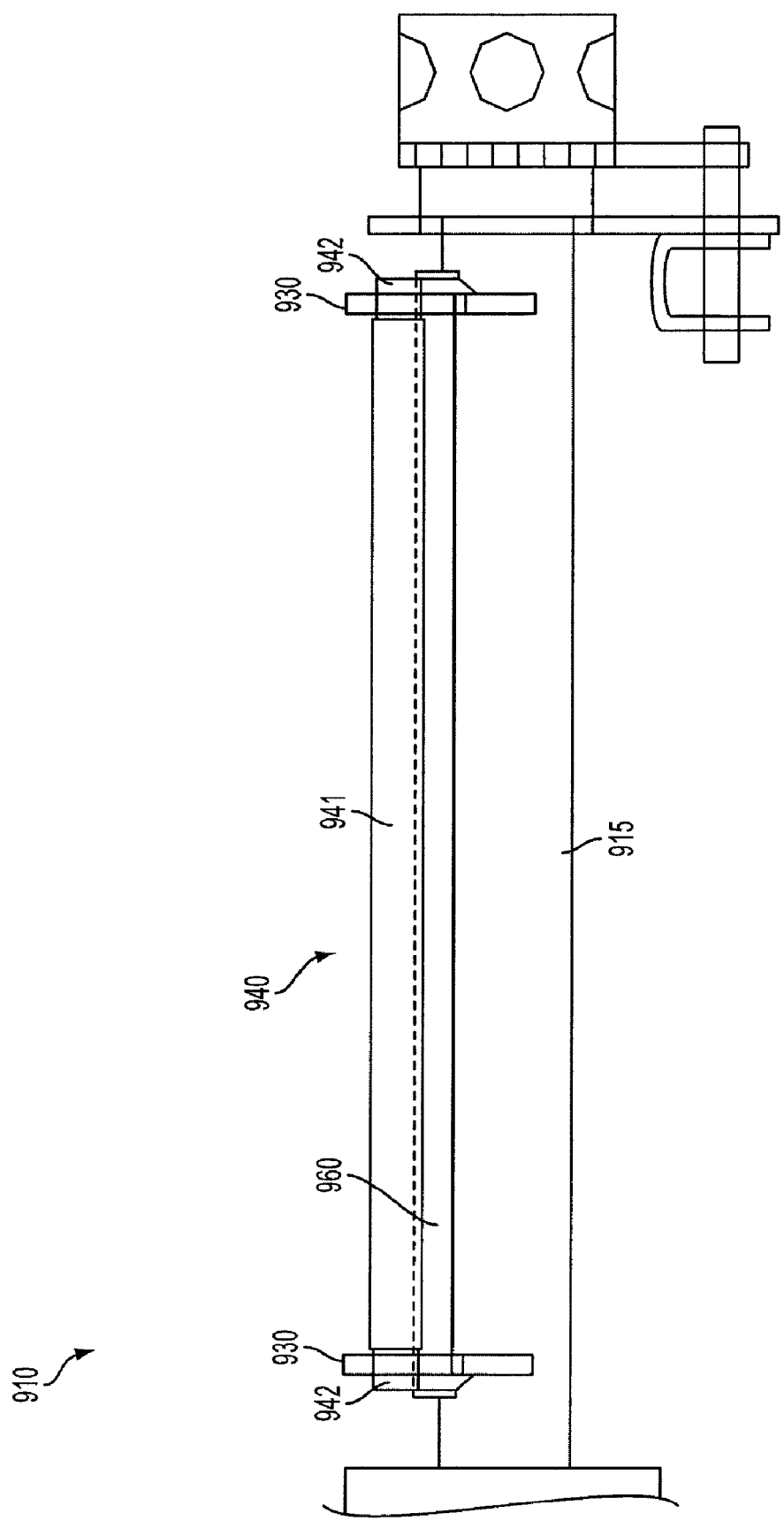
FIG. 26 illustrates the retrofitted strap tie-down apparatus of FIGS. 24 and 25, shown as apparatus.
Figure 27A:
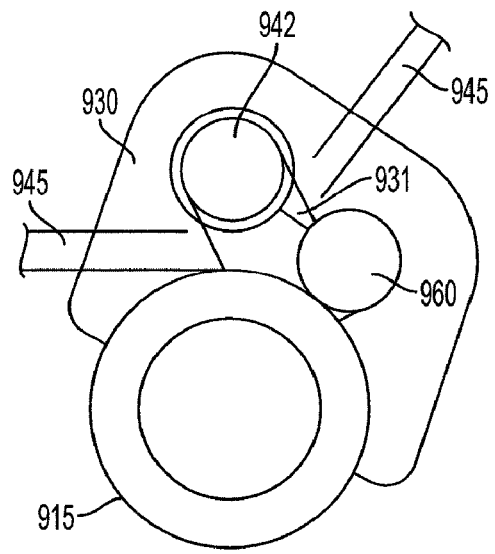
FIGS. 27A and 27B illustrate side views of the central shaft and shaft plates of FIG. 26.
Figure 27B:
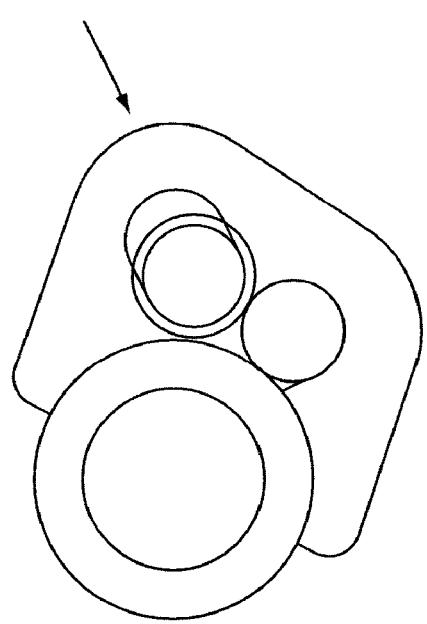

FIGS. 24 and 25 illustrate a retrofitted strap tie-down apparatus 710, 810. FIG. 26 illustrates the retrofitted strap tie-down apparatus of FIGS. 24 and 25, shown as apparatus 910. In exemplary embodiments, shaft plates 930 are coupled to the central shaft 915. In exemplary embodiments, the shaft plates 930 are coupled to the central shaft 915 orthogonally (e.g., perpendicular to the central shaft 915). During the retrofit process, the shaft plates 930 are welded to the central shaft 915. FIGS. 27A and 27B illustrate side views of the central shaft 915 and shaft plates 930 of FIG. 26. The shaft plates 930 include slots 931. FIG. 27A illustrates the first parallel shaft 940 positioned away from the central shaft 915 and second parallel shaft 960. FIG. 27B illustrates the first parallel shaft 940 in contact with the central shaft 915 and the second parallel shaft 960.

In exemplary embodiments, a first parallel shaft 940 is positioned parallel to the central shaft 915 and is constrained by the slots 931. The first parallel shaft 940 includes a central portion 941 and ends 942, which are positioned within the slots 931. In exemplary embodiments, a radius of the central portion 941 is greater that a radius of the ends 942 and of the slots 931. In addition, the central portion 941 is concentric with the ends 942. In exemplary embodiments, the radius of the slots 931 is greater than the radius of the ends 942. In this way, the first parallel shaft 940 can be in contact with the central shaft 915 (and second parallel shaft 960 as described herein) or spaced away from the central shaft 915, depending on the position of the first parallel shaft 940 within the slots 931. A second parallel shaft 960 is positioned adjacent, parallel and in mechanical contact with the central shaft 915 and fixed with respect to the shaft plates 930. In this way, the first parallel shaft 940 is movable to and away from the central shaft 915 and the second parallel shaft 960 is fixed with respect to the central shaft 915. During the retrofitting process, the first and second parallel shafts 940, 960 can be fitted within the shaft plates 930, with the shaft plates 930 subsequently being welded to the central shaft 915. In exemplary embodiments, when the chain tie down system is an enclosed tie down system, when the aperture 807 is cut (See FIG. 25), trim 809 can be added to along edges of the aperture 807 to cover any sharp edges that may be formed in the cutting process.

In exemplary embodiments, a strap can be confined to a space 945 between the shaft plates 930 laterally and the central shaft 915 and first parallel shaft 940 radially. In exemplary embodiments, rotation of the central shaft 915 causes the first parallel shaft 940 to pinch down on the strap, resulting in a self-tightening action as described herein. The second parallel shaft 960 provides additional support for the first parallel shaft 940 and decreases the swing radius, that is, the distance the first parallel shaft 940 travels during the self-tightening action.

A winch end of the strap is continuously adjustable. Ends of the strap around the wheel 901 are incrementally adjustable in a series of slots in the platform. In exemplary embodiments, a fixed hook and an intermediate hook can be placed in the appropriate slot when positioning the wheel 901 on the platform prior to tightening the strap.

FIG. 28 illustrates a wrap sequence of the apparatus 910 as described herein. In a start position the strap 950 is positioned between both the central shaft 915 and second parallel shaft 960, and the first parallel shaft 940. In the start position the first parallel shaft 940 rests on the strap 950 that rests on the central shaft 615 and second parallel shaft 960. In a ¼ turn, the first parallel shaft 940 may begin to move within the slots 931 and away from the strap 950 and the central shaft 615 and the second parallel shaft 960. In a ½ turn, the first parallel shaft 940 falls under the force of gravity from the strap 950 and the central shaft 915 and the second parallel shaft 960. In a ¾ turn, the first parallel shaft 940 may begin to move toward the strap 690 and the central shaft 915 and the second parallel shaft 960 once again. In a full turn, the strap 950 comes into contact with itself and the first parallel shaft 940 falls against the strap 950 and the central shaft 915 and the second parallel shaft 960 under the force of gravity and a tension force of the strap 950 in its self-tightening response between the central shaft 915 and the second parallel shaft 960, and the first parallel shaft 940. Subsequent turns such as a 1¼ turn further tighten the strap 950 onto the central shaft 915, the second parallel shaft 960 and parallel shaft 940.

Figure 29:
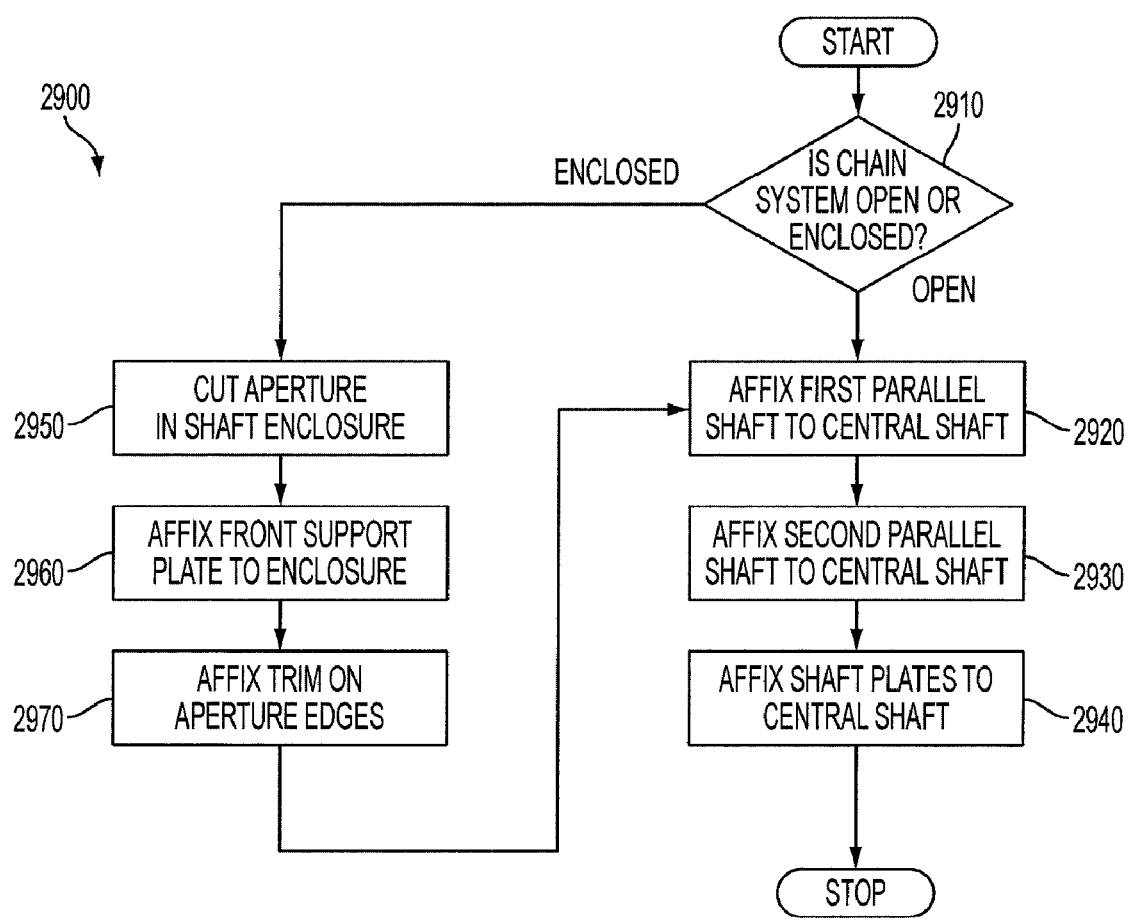
FIG. 29 illustrates a flow chart for a method for retrofitting a chain tie down system into a strap tie down system in accordance with exemplary embodiments.

FIG. 29 illustrates a flow chart for a method 2900 for retrofitting a chain tie down system into a strap tie down system in accordance with exemplary embodiments. At block 2910, it is determined whether the chain tie down system is an open system or an enclosed system as described herein. If the chain tie down system is open, then at block 2920 a first parallel shaft is affixed to the central shaft in accordance with the exemplary embodiments described herein. At block 2930, a second parallel shaft can be optionally affixed to the central shaft as described with respect to the embodiments of FIGS. 24-28. At block 2940, shaft plates are further affixed to the central shaft. It is appreciated that the order in which the above-described components are affixed to the central shaft can vary. For example, the parallel shafts can be first affixed to the shaft plates with the shaft plates subsequently affixed to the central shaft. Alternatively, one shaft plate can be affixed to the central shaft, the parallel shafts affixed to the first shaft plate, with the second shaft plate subsequently affixed to the central shaft. It is appreciated that there are a variety of ways that the components can be affixed. In exemplary embodiments, the components are welded to the central shaft.

If at block 2910, an enclosed tie down system is being retrofitted, then at block 2950, an aperture is cut into the shaft enclosure to expose the central shaft. At block 2960 a front support plate is affixed to the shaft enclosure. At block 2970, trim can be affixed to any rough edges resulting from cutting out the aperture so that the strap does not become frayed or otherwise damaged by any edges. Then at block 2920 a first parallel shaft is affixed to the central shaft in accordance with the exemplary embodiments described herein. At block 2930, a second parallel shaft can be optionally affixed to the central shaft as described with respect to the embodiments of FIGS. 24-28. At block 2940, shaft plates are further affixed to the central shaft. In the embodiment of an enclosed chain tie down system, it is appreciated that the aforementioned blocks may be done in any order along with the order of affixing the parallel shafts and shaft plates as necessary for ease of retrofitting.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A strap tie-down apparatus, comprising:
 a central shaft;
 a first parallel shaft affixed to the central shaft via shaft plates that have been welded to the central shaft; and
 a second parallel shaft welded to the central shaft,
 wherein the first parallel shaft is moveable with respect to the central shaft via the shaft plates.

2. The apparatus as claimed in claim 1 wherein a radial movement between the first shaft and the second shaft forms a gap between the central shaft and the first parallel shaft.

3. The apparatus as claimed in claim 2 wherein the gap is configured to receive a strap.

4. The apparatus as claimed in claim 1 wherein the first parallel shaft comprises:
 a central portion; and
 a first end and a second end of the central portion,
 wherein the first end and second end have a radius that is less than a radius of the central portion.

5. The apparatus as claimed in claim 4 wherein the first and second ends are disposed in slots disposed on the shaft plates.

6. The apparatus as claimed in claim 5 wherein the slots have a radius greater than the radius of the ends and less than the radius of the central portion.

7. The apparatus as claimed in claim 1 further comprising a shaft enclosure having an aperture.

8. The apparatus as claimed in claim 7 further comprising a front support plate affixed to the shaft enclosure.

* * * * *